United States Patent
Cox et al.

(10) Patent No.: US 11,609,679 B2
(45) Date of Patent: *Mar. 21, 2023

(54) CONTENT CACHING SERVICES IN SATELLITE AND SATELLITE/IP CONTENT DELIVERY SYSTEMS

(71) Applicant: Sirius XM Radio Inc., New York, NY (US)

(72) Inventors: Stuart A. Cox, Roswell, GA (US); Paul Marko, Pembroke Pines, FL (US); Craig Wadin, Sunrise, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,472

(22) Filed: Nov. 6, 2019

(65) Prior Publication Data

US 2020/0077139 A1    Mar. 5, 2020

Related U.S. Application Data

(63) Continuation of application No. 15/384,947, filed on Dec. 20, 2016, now Pat. No. 10,511,883, which is a
(Continued)

(51) Int. Cl.
*G06F 3/0482* (2013.01)
*G11B 27/10* (2006.01)
(Continued)

(52) U.S. Cl.
CPC ............ *G06F 3/0482* (2013.01); *G06N 5/02* (2013.01); *G11B 27/105* (2013.01); *H04H 40/90* (2013.01); *H04L 65/60* (2013.01); *H04L 65/611* (2022.05); *H04L 65/612* (2022.05); *H04L 65/765* (2022.05); *H04L 67/568* (2022.05); *H04N 5/76* (2013.01); *H04N 9/8205* (2013.01); *H04N 21/4331* (2013.01); *H04N 21/4627* (2013.01); *H04N 21/4668* (2013.01); *H04N 21/47217* (2013.01); *H04N 21/4821* (2013.01); *H04N 21/4826* (2013.01); *H04N 21/6125* (2013.01); *H04N 21/6143* (2013.01);
(Continued)

(58) Field of Classification Search
CPC .............................. G06F 16/638; G06F 3/0482
See application file for complete search history.

(56) References Cited

U.S. PATENT DOCUMENTS 8,019,773 B2 *   9/2011   Kobayashi ............ G06F 16/639
                                                                707/706
9,152,300 B2 *  10/2015   Poniatowski ......... G06F 3/0482

* cited by examiner

*Primary Examiner* — Cao H Nguyen
(74) *Attorney, Agent, or Firm* — Kramer Levin Naftalis & Frankel LLP

(57) ABSTRACT

Systems and methods are presented to facilitate caching of programming from broadcast and/or content streaming services to a user device for local playback. In addition, metadata can be provided to guide the user in selecting, caching, or playing the cachable content. In some exemplary embodiments, a receiver or other user device can automatically select the programming to be cached based on a user's historical topic interest and listening history. In some exemplary embodiments, the metadata can also include DRM information that can limit the ability of a user to playback the content, so as to comply, if necessary, with operative legal requirements related to usage of the content.

17 Claims, 26 Drawing Sheets

Related U.S. Application Data continuation of application No. 14/155,303, filed on Jan. 14, 2014, now Pat. No. 9,549,012, which is a continuation-in-part of application No. PCT/US2012/046979, filed on Jul. 16, 2012.

(60) Provisional application No. 61/572,332, filed on Jul. 14, 2011.

(51) Int. Cl.

| | | |
|---|---|---|
| *H04N 5/76* | (2006.01) | |
| *H04N 9/82* | (2006.01) | |
| *H04L 65/60* | (2022.01) | |
| *H04N 21/433* | (2011.01) | |
| *H04N 21/4627* | (2011.01) | |
| *H04N 21/466* | (2011.01) | |
| *H04L 65/612* | (2022.01) | |
| *H04L 65/75* | (2022.01) | |
| *H04L 67/568* | (2022.01) | |
| *H04H 40/90* | (2008.01) | |
| *G06N 5/02* | (2006.01) | |
| *H04N 21/2668* | (2011.01) | |
| *H04N 21/472* | (2011.01) | |
| *H04N 21/482* | (2011.01) | |
| *H04N 21/61* | (2011.01) | |
| *H04L 65/611* | (2022.01) | |
| *H04W 88/06* | (2009.01) | |
| *H04N 21/439* | (2011.01) | |

(52) U.S. Cl.
CPC ..... *H04N 21/6175* (2013.01); *H04N 21/6193* (2013.01); *H04W 88/06* (2013.01); *H04N 21/2668* (2013.01); *H04N 21/439* (2013.01)

FIG. 6 - Exemplary Showcase Selection Icon (upper right)

FIG. 7 - Exemplary Menu Of Cached Showcase Content That A User Can Select For Listening FIG. 8 - Exemplary Showcase Content Menu, Where The User Has Scrolled Down.

FIG. 9 - Exemplary "Now Playing" Screen After User Has Selected One Of The Showcase Titles For Playback.

FIG. 14

Table 1. Rolling 14 Day Schedule Illustrating 24 Hours Of Showcase Content Delivery Showcase Program Composition Showcase Program File

| Showcase File Header |
|---|
| Metadata File |
| Compressed Text File |
| Track 0 Compressed Audio File |
| Track 1 Compressed Audio File |
| Track 2 Compressed Audio File |
| Track 3 Compressed Audio File |
| Track 4 Compressed Audio File |
| Artwork File |
| Artwork File |

FIG. 17

Pair Count TAG example

Example Text Indexing

A PARAMETER value of 0x10 identifies the 17th byte of the uncompressed file which is the first byte of Text String A A PARAMETER value of 0x24 identifies the 37$^{th}$ byte of the uncompressed file which is the first byte of Text String B

US 11,609,679 B2

CONTENT CACHING SERVICES IN SATELLITE AND SATELLITE/IP CONTENT DELIVERY SYSTEMS

CROSS-REFERENCE TO RELATED APPLICATIONS

This application is a continuation of U.S. application Ser. No. 15/384,947, filed on Dec. 20, 2016, which is a continuation of U.S. application Ser. No. 14/155,303, filed on Jan. 14, 2014, which issued as U.S. Pat. No. 9,549,012, on Jan. 17, 2017, which is a continuation-in-part to the PCT Application No. PCT/US2012/046979, filed on Jul. 16, 2012, which published as WIPO Patent Application WO/2013/010189 on Jan. 17, 2013, and which claims the benefit of U.S. Provisional Patent Application No. 61/572,332, filed on Jul. 14, 2011. This application also claims the benefit of U.S. Provisional Patent Application No. 61/791,893, filed Mar. 15, 2013. Each of these prior applications is hereby incorporated herein by reference. Related subject matter is further disclosed and claimed in PCT/US2012/025091 filed on Feb. 14, 2012 (the "Tune Start" application), the entire contents of which are also hereby incorporated by reference.

TECHNICAL FIELD

The present application relates to broadcast and receiver technology, and in particular to methods and apparatus to receive and locally store audio and other content from a broadcaster or streamed content provider.

BACKGROUND OF THE INVENTION

In a radio receiver or other device capable of receiving multiple channels from a broadcast or streamed content provider, users are provided with many programming options. Such users often have a few channels which they regularly listen to, and given the vastness of offerings and specialty channels, may generally not be aware of other content available from the system. Additionally, because one can only listen to so many channels at once, even by repeatedly switching between them, such a user may not be able to listen during their usual live listening times to all programming that they may truly enjoy. In most of these instances, recording of a program is not available because of "digital rights management" (DRM) issues. In such instances, the user is unable to enjoy the programming.

What is thus needed in the art are systems and methods that can allow such users to shift programs of interest in time from their regularly scheduled broadcasts to times that are more convenient. What is further needed are systems and methods that allow such time shifting to be dynamically personalized to a given user.

SUMMARY OF THE INVENTION

Systems and methods are presented to facilitate caching of programming from broadcast and/or content streaming services to a user device for local playback. In addition, metadata can be provided to guide the user in selecting, downloading, or playing the downloadable content. In some exemplary embodiments, a receiver or other user device can automatically select the programming to be downloaded based on a user's historical topic interest and listening history. In some exemplary embodiments, the metadata can also include DRM information that can limit the ability of a user to playback the content, so as to comply, if necessary, with operative legal requirements related to usage of the content.

BRIEF DESCRIPTION OF THE DRAWINGS

Exemplary embodiments of the present invention will be more readily understood with reference to the exemplary embodiments thereof illustrated in the attached drawing figures.

It is noted that the U.S. patent or application file contains at least one drawing executed in color. Copies of this patent or patent application publication with color drawings will be provided by the U.S. Patent Office upon request and payment of the necessary fee.

FIG. 14 illustrates a rolling 14 day schedule illustrating 24 hours of content delivery according to exemplary embodiments of the present invention;

FIG. 17 presents an exemplary showcase program file according to exemplary embodiments of the present invention;

DETAILED DESCRIPTION OF THE INVENTION

Figure 1:
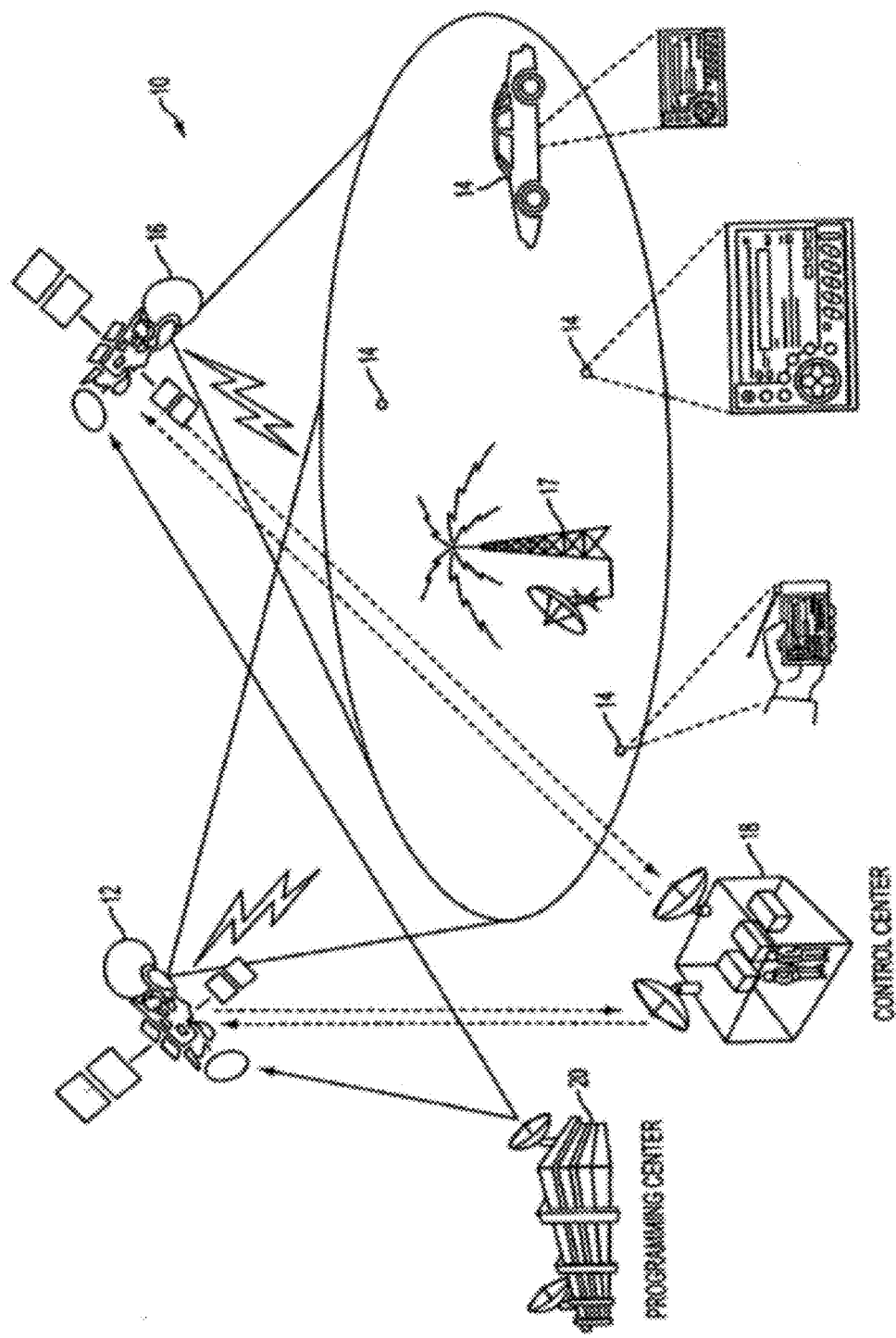
FIG. 1 depicts an exemplary satellite radio content delivery system in accordance with an exemplary embodiment of the present invention.

The present invention generally relates to an operation, known herein as "Content Caching," implemented on a broadcast or streamed content receiver or user device that is arranged to receive and locally store audio and other content from a content provider. The operation is part of a Content Caching Service ("CCS") that can be provided by a content provider, such as, for example, a satellite digital radio service or a content streaming service. In exemplary embodiments of the present invention, content can also be delivered along with associated metadata that is useful to end-user consumption, similar to the data in an "electronic program guide" (EPG). Such data can include, for example, program titles, descriptions, topic assignments, original air dates if applicable, program logos, and the like.

Thus, CCS is a data service that pushes audio and other content over a broadcast system to receivers, where the content is cached in non-volatile storage for later playback by the user. CCS is particularly optimized for efficiently broadcasting large blocks of content (e.g., hours of audio programming) to a large set of receivers over an extended period of days or weeks.

Downloading" usually implies a request/response model (pull), whereas Showcase focuses on a push model. Maybe "caching" would be a better term in lieu of "downloading".

CCS can be used to deliver a "Showcase" feature. Showcase pushes groups of pre-recorded programs over, for example, a satellite network, for storage in receivers. Each group can contain, for example, up to roughly 16 hours of various programs selected based on related content and/or marketing objectives. In general, the content in a Showcase group can be selected to expose users to content they may not be aware of or able to listen to live during their usual live listening times.

Once a Showcase group is fully received by a radio product (which can, for example, require around 4 hours of cumulative radio on-time over a period of a week to a month), the user can then listen to the Showcase programs by playing them back locally on the product.

In exemplary embodiments of the present invention, multiple Showcase groups can be transmitted at the same time. A radio product can, for example, optionally provide a user with a synopsis of upcoming Showcase groups, so that the user can select which Showcase group(s) they are interesting in receiving (or not receiving).

In exemplary embodiments of the present invention an exemplary Showcase service can provide metadata useful for describing the contents of each group, as well as metadata specific to each program included in a group. Finally, a Showcase service can also include rights management information, such as, for example, restrictions on the number of times a program can be played and date ranges within which programs may be played.

Many other similar services can also utilize CCS. Options include services delivering larger or smaller groups of audio content, services delivering mixed media content, such as, for example, audio synchronized with still images and video clips.

In exemplary embodiments of the present invention, a radio receiver, or other user device, can be configured for Content Caching. Such configuration enables it to receive at least one broadcast or streamed content service (e.g., metadata, audio, and/or video) comprising a plurality of different channels, which can then be downloaded locally. The receiver has a memory or other storage means, such as, for example, RAM, HDD, flash or other storage media. In exemplary embodiments of the present invention, the receiver can also receive metadata associated with the downloadable content, and a user interface can provide information on such downloadable content to, and can, for example, prompt a user, regarding downloading such content. In exemplary embodiments of the present invention, such a receiver can also, for example, determine and implement whether to automatically download content based on a user's historical topical interests and listening history, or can, for example, simply download the content based on instructions sent from the content provider within the broadcast or data streaming. In exemplary embodiments of the present invention, an exemplary user interface can include one or more physical buttons on the receiver interface to initiate such Content Caching or can, for example provide active controls in a displayed interface.

In alternate preferred exemplary embodiments of the present invention, caching can, for example, be performed automatically without requiring user action.

In exemplary embodiments of the present invention, Content Caching avoids limitations of services and products that seek to provide a user with live programming options with no method of legally downloading content. On the other hand, in exemplary embodiments of the present invention, Content Caching also avoids the disadvantages of existing products and services that merely record programs without any consideration of digital rights management information. In exemplary embodiments of the present invention, content can be received from one or more streams and from diverse sources. In the case of a user receiving an exemplary Satellite Digital Audio Radio Service ("SDARS"), or similar programming service, Content Caching can make radio receivers, user devices and similar products increasingly attractive to consumers, while also leveraging additional commercial value from a unique broadcast pipe of diverse curated content such as, for example, Sirius XM Radio's SDARS services.

Overview of Exemplary System Architecture

Exemplary embodiments of the present invention are next described with respect to a satellite digital audio radio service (SDARS) that is transmitted to a plurality of receivers by one or more satellites and/or terrestrial repeaters. It is understood that a source content stream(s) used to achieve a Content Caching operation in accordance with the present invention can be broadcast, streamed or otherwise transmitted, using an SDARS or any other content delivery system, such as, for example, digital audio broadcast (DAB) systems, high definition (HD) radio systems, two-way Internet Protocol (IP) system), etc. as well as other wireless or wired methods for signal transmission. It is further understood that a source content stream(s) used to achieve Content Caching in accordance with the present invention can further be received by user devices other than radio receivers that are configured to receive multiple channels of broadcast or streamed content.

Figure 2:
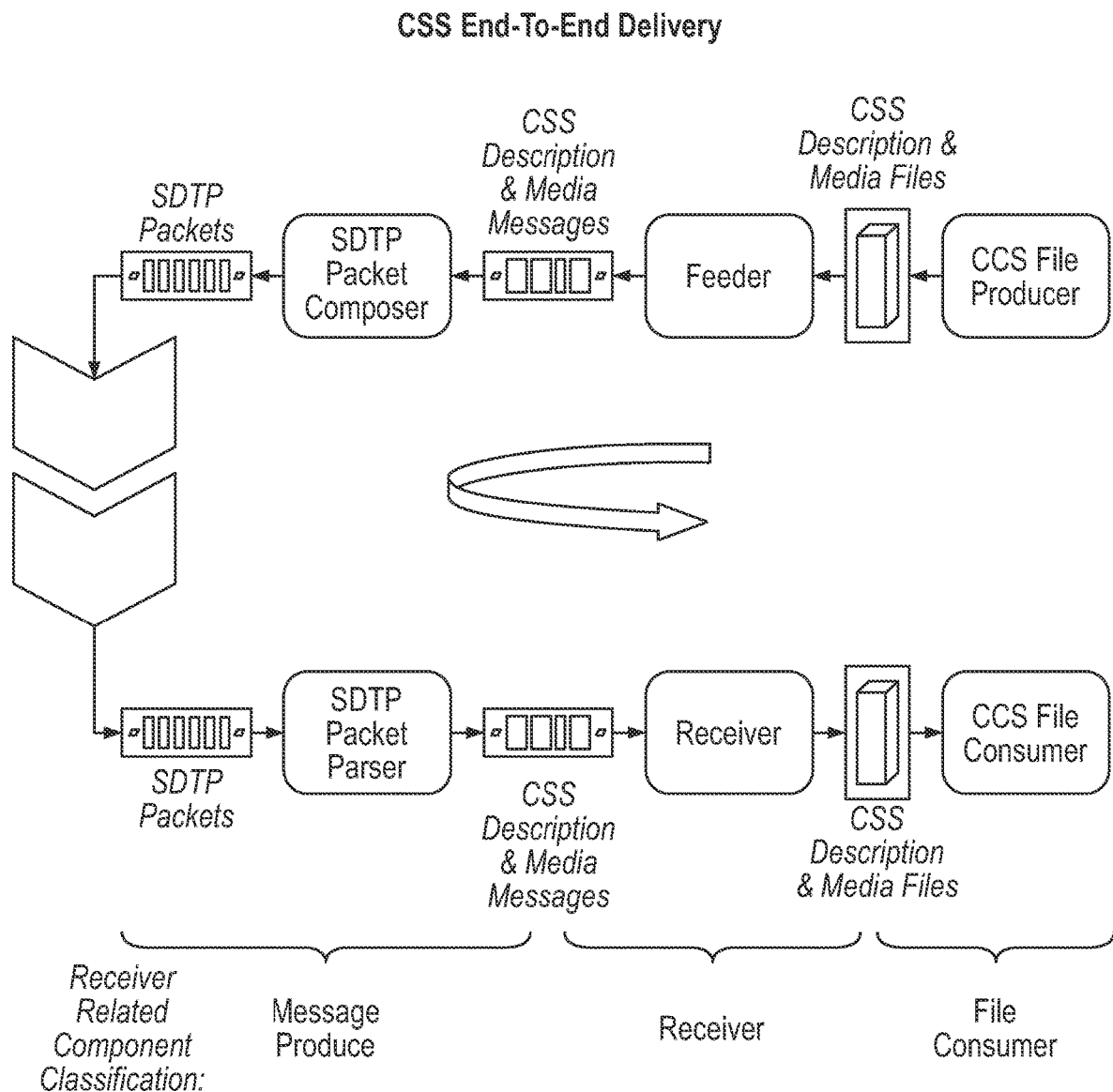
FIG. 2 depicts an exemplary data stream, with embedded CSS data in accordance with an exemplary embodiment of the present invention.
Figure 2A:
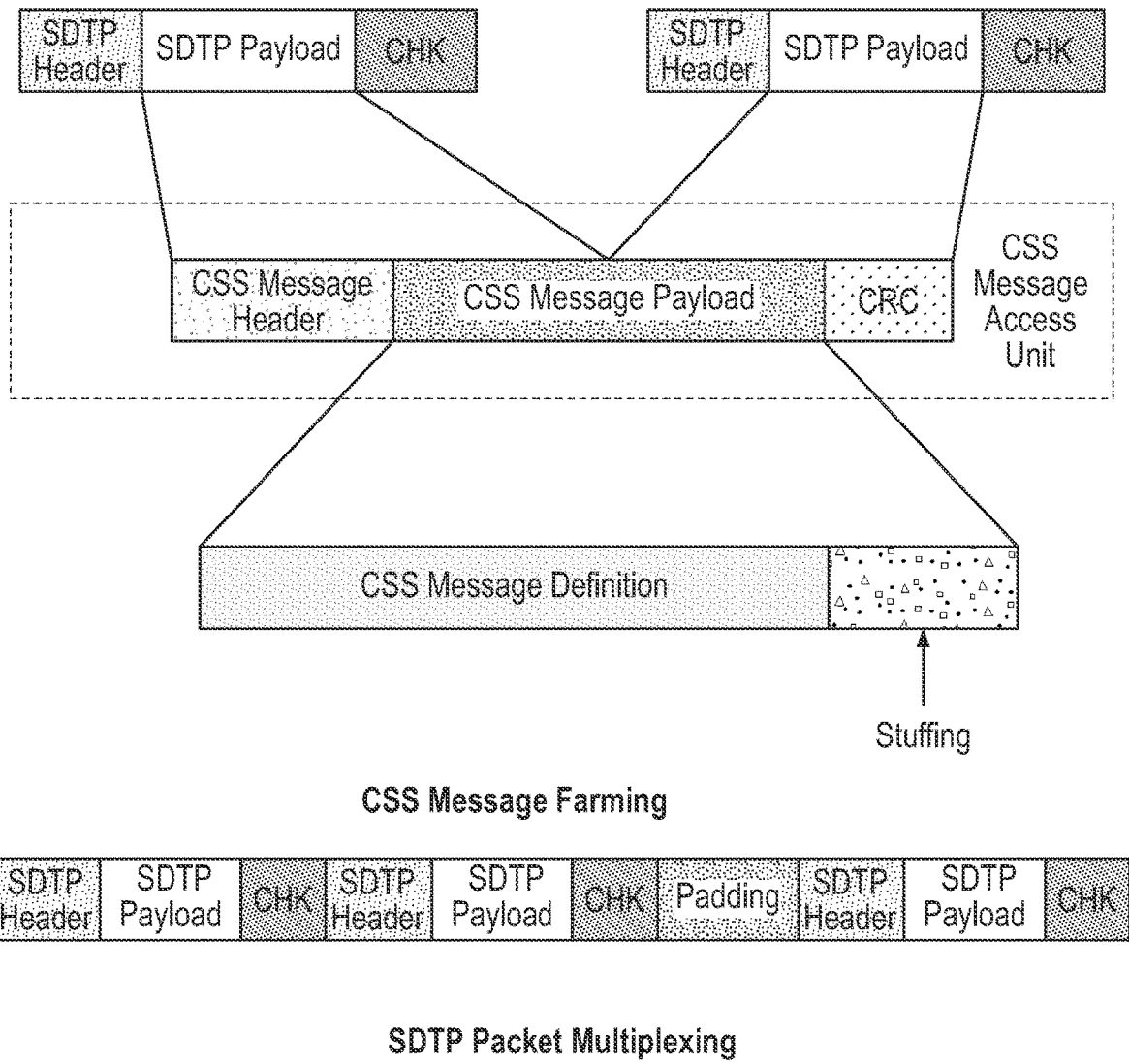
FIG. 2A depicts an exemplary CSS message framing, as well as an exemplary SDTP Packet Multiplexing format, for use in the exemplary data stream of FIG. 2.

FIG. 1 depicts an exemplary satellite radio content delivery system in accordance with an exemplary embodiment of the present invention. FIG. 2 depicts an exemplary data stream, with embedded CSS data in accordance with an exemplary embodiment of the present invention, and FIG. 3 depicts an exemplary receiver or other user device configured to receive a satellite radio broadcast in accordance with an exemplary embodiment of the present invention.

Figure 3:
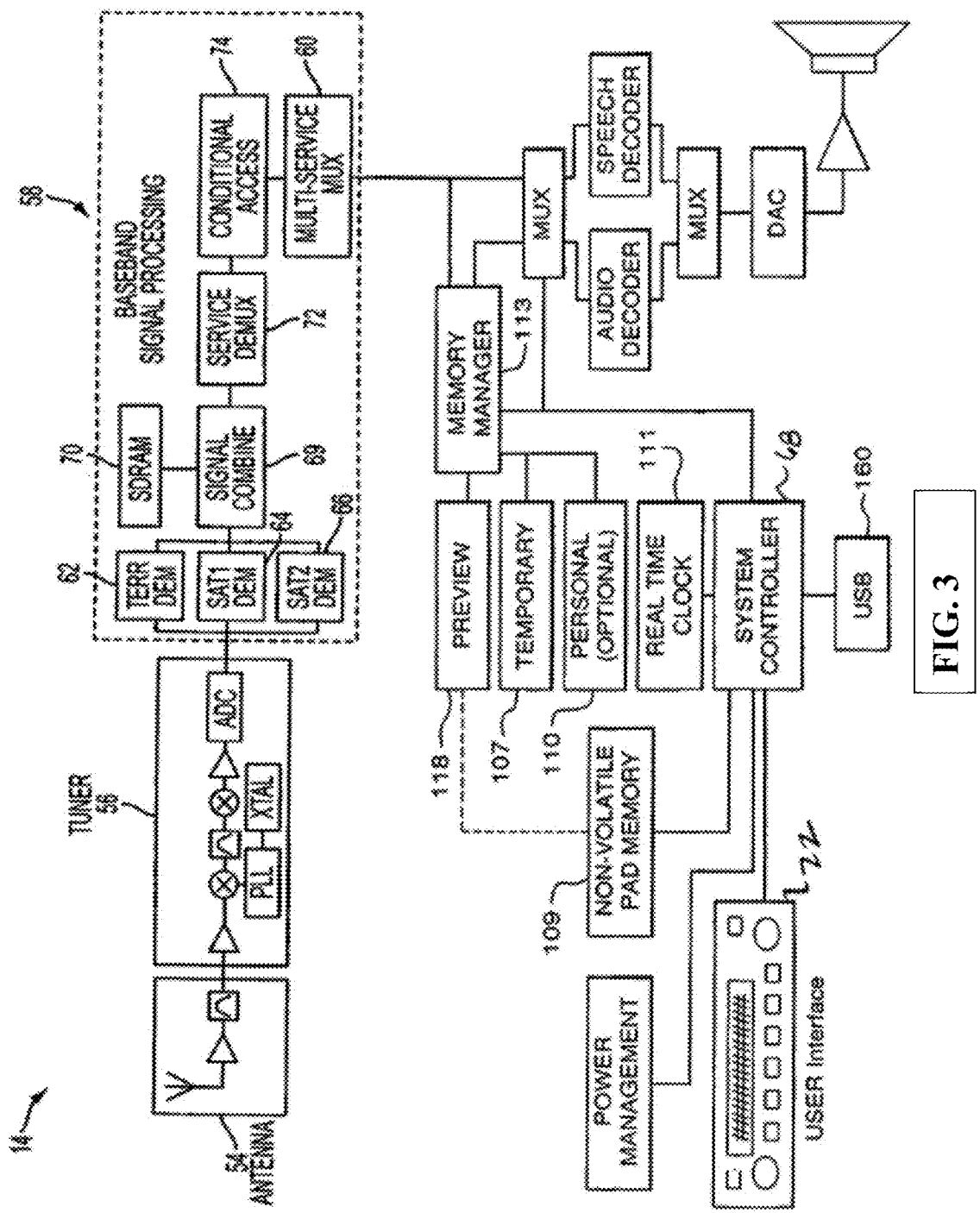
FIG. 3 depicts an exemplary receiver or other user device configured to receive a satellite radio broadcast in accordance with an exemplary embodiment of the present invention.

An exemplary receiver 14 is depicted in FIG. 3. Receiver 14 preferably comprises an antenna 54 for receiving, for example, an SDARS signal and/or other broadcast streams, a tuner 56, baseband signal processing components indicated generally at 58, a system controller 68, a multi-service multiplexer MUX 60 and memory, among other components. As noted above, exemplary embodiments of the present invention can be implemented in other types of user devices that can receive content (e.g., metadata and/or audio and/or video delivered by broadcast or streaming) such as, for example, mobile telephones, personal computers, personal data assistants, portable computing devices, different types of receivers, and the like.

Continuing with reference to FIGS. 1 and 3, receiver 14 can comprise three receiver arms for processing an SDARS broadcast stream from two satellites 12, 16 and terrestrial repeater 17. The receiver can include, for example, demodulators 62, 64, 66, and signal combiner 69 in combination with SDRAM 70. The signal can be demultiplexed to recover channels from the various SDARS broadcast signals it receives, as indicated by signal combining module 69 and service demultiplexer module 72. It is noted that processing of a received SDARS broadcast stream is described in further detail in commonly owned U.S. Pat. Nos. 6,154,452 and 6,229,824, the entire contents of which are hereby incorporated herein by reference. In exemplary embodiments of the present invention, a conditional access module 74 can optionally be provided to restrict access to certain de-multiplexed channels. For example, each receiver 14 in an SDARS system can be provided with a unique identifier by which it can be individually addressed over-the-air, to facilitate conditional access such as, for example, enabling or disabling services or tiers of subscription, or to provide custom applications such as, for example individual data services or group data services. In exemplary embodiments of the present invention, a demultiplexed service data stream can be provided to output from a multi-service multiplexer 60 under control and management of system controller 68.

Glossary

The following glossary of terms and acronyms is provided to simplify the following discussion of the contents and use of CCS files according to exemplary embodiments of the present invention.

| Term | Definition |
| --- | --- |
| Channels | Audio and data channels transmitted over existing XM bandwidth. |
| Carousel | A method of broadcasting a set of data where the data is repeatedly sent in a loop. "Carousel" also refers to one full loop of the broadcast data. |
| CCS | Content Caching Service. |
| DSI | Data Service Identifier. A fixed integer identifier assigned to each data service. DSIs are used by the HMI to request reception of a given service from the receiver chip. |
| DSMT | Data Service Mapping Table. A utility data service used internally by exemplary receivers to resolve requests for a service identified by a DSI into specific SID(s) used to extract that service. |
| EIPSC | Enterprise IP Service Center. A server used for IP-based services such as streaming, On-Demand, Seasons Pass, etc. |
| Feeder | Refers to the server that formats CCS data for transmission over the air (i.e. "feeds" the uplink). |
| HMI | Human-Machine Interface. This software runs in a product, controls a receiver, and presents the UI to the user. |
| kbps | Kilobits per second (1000 bits per second), a measure of bandwidth usage. |
| Kbytes | 1024 bytes |
| NVM | Non-volatile Memory. |
| OTA | Over The Air |

-continued

| Term | Definition |
| --- | --- |
| Protocol | A technical specification of the data format used to transmit a data service over the air. |
| Radio, Receiver | In the context of this document "radio" and "receiver" both refer to a product capable of receiving a satellite or other broadcast signal. |
| RFD | Reliable File Delivery. A general data encoding, transmission, and decoding technology where a binary file is transmitted as a stream of blocks which are over time accumulated by a product. Once a sufficient number of blocks are accumulated by the product (typically a cumulative size a few percent larger than the original binary file size), the product HMI executes RFD decoder software to reconstruct the original binary file. The specific encoding/decoding method can be based on one of a number of methods, such as those described by the paper Peter Elias "Coding for Two Noisy Channels", Information Theory, Third London Symposium, 1955. This method has the advantage that the product can gradually accumulate any of the streamed blocks over a long duration: days, weeks or even months. |
| SDTP | Sirius XM Data Transport Protocol. The transport protocol used to packetize the CCS data for over the air transmission. |
| SXi | Sirius XM Interconnect protocol. The protocol used by the HMI to communicate with a G4 receiver chipset (e.g. C65). Also refers colloquially to the firmware running on the receiver chipset. |
| UI | User Interface |

Content Caching: System Overview

FIG. 2 illustrates exemplary service transmission channels providing "Content Caching Service" (CCS) data. In an exemplary system, CCS data can consist of two different components. Namely a CCS Description File and a CCS Media File. These components can, for example, be broadcast over a satellite network over one or more SIDs, or channels configured to deliver data services. Other exemplary implementations can, for example, combine or further separate these components.

In exemplary embodiments of the present invention, a CCS Description File can contain metadata describing a corresponding CCS Media File, including, for example, an overall description of the content, detailed descriptions of the programs contained in the Media File, and data identifying the source data channel of the Media File to the receiver. CCS Description Files can, for example, be transmitted as a standard carousel (i.e., same data repeatedly transmitted every 5 to 15 minutes) and can be relatively small.

In exemplary embodiments of the present invention, the CCS Media File can contain the media associated with a CCS transmission, such as, for example, compressed audio for multiple audio programs and images for program logos. CCS Media Files can be delivered using, for example, a "Reliable File Delivery" (RFD) encoding technology or the like, and can be relatively large (e.g., on the order of 175 MBytes for 16 hours of talk/music mix). RFD technologies are those that, as provided in the Glossary above, are general data encoding, transmission, and decoding technologies where a binary file is transmitted as a stream of blocks which are over time accumulated by a product. Once a sufficient number of blocks are accumulated by the product (typically a cumulative size a few percent larger than the original binary file size), the product HMI may execute RFD decoder software to reconstruct the original binary file. The specific encoding/decoding method can be based on one of a number of methods, such as those described by Peter Elias, Coding for Two Noisy Channels, Information Theory, Third London Symposium (1955). This method has the advantage that the product can gradually accumulate any of the streamed blocks over a long duration: days, weeks or even months.

In exemplary embodiments of the present invention, CCS Description Files can be received and processed by a receiver before it commences to receive the Media Files. This can, for example, allow a receiver to present information to the user about forthcoming CCS-delivered content for selection/rejection, or to use receiver-based algorithms to select particular CCS Media Files based on a user's historical topic interests. In exemplary embodiments of the present invention, a content provider can also determine to send content to a user without prompting by a user.

In exemplary embodiments of the present invention, each Description File can contain information that can be used by a receiver to determine the source of a Media File, as well as the dates/times when the transmission of the Media File will start and end.

In exemplary embodiments of the present invention, the metadata provided for each CCS Description File can include, but need not be limited to, title of the content, description of the content and/or purpose, DRM information, imagery associated with the content (e.g., a logo), specifications that indicate the radio receiver capabilities required for displaying some or all of the content (e.g., can a receiver without a an image displayer receive the content if there are images required to be displayed with the content), order of the content (e.g., which content should be displayed to the user when there is multiple content); and duration of the content (e.g., allowable start and/or stop dates to display to the user).

An exemplary method for implementing Content Caching is next described involving one direction of communication or data flow. In this example, a content provider assembles a group of audio programs intended for a Content Caching group. In exemplary embodiments of the present invention, an exemplary console tool can be used by an operator to select content stored by the content provider from a master library, and used to assemble groups of selected content, as well as to enter and collect metadata associated with the content (overall synopsis, specific EPG-like program descriptions, program logos, program topics, DRM information, etc.). The exemplary tool can also allow the operator to specify transmission windows, including start/stop dates for the Content Caching group transmission, and optional earlier start dates for the Description File transmission (i.e., so as to provide the descriptive information to the user ahead of the actual content transmission).

In exemplary embodiments of the present invention, a content provider can submit the assembled Content Caching group to a CCS Feeder which can, for example, prepare the data for transmission. The CCS Feeder can build the CCS Description File from the input Content Caching group data, and can, for example, submit the data to an uplink for continuous transmission during the period of time designated for that file.

In exemplary embodiments of the present invention, a CCS feeder can build the CCS Media File from the input Content Caching group content (e.g., actual compressed audio files), and invoke an RFD server. The RFD server can then, for example, encode the Media File as a continuous series of RFD blocks, transmitted during the period of time designated for that Media File.

In exemplary embodiments of the present invention, a radio receiver can monitor a data channel looking for new CCS Description Files, and maintain a list of available Media Files (both ongoing and future transmissions). Thus, the receiver can determine which CCS Media File(s) it will receive, either by presenting a summary of the content to the user for selection/rejection, or, for example, by automatically selecting one or more of the Media Files. Optionally, for example, automatic selection can be based on aligning the user's historical or explicit topical interests with the topics of the Media Files, e.g. sports, political talk, music, etc. or by selection by the content provider, as described below. The identification of a user's interest can, for example, be done by the radio receiver, or by interaction with the receiver's user interface. Selection of the program content can, for example, be determined by using identifiers in the metadata such as, for example, the Media File ID or the Media File Topics as discussed below.

In exemplary embodiments of the present invention, a receiver can use information in the CCS Description Files to locate source data channels for the selected CCS Media Files, and accumulate the received content. CCS Media Files can, for example, be received as a series of RFD-encoded blocks, which can, for example, be accumulated into a radio's non-volatile memory. Such accumulation can, for example, take days or weeks, depending on the size of the files, bandwidth used to transmit the files, and how often the user operates the radio in satellite or other transmission signal. This process can, for example, occur in the background, invisible to the user. Due to the nature of satellite or other transmission signals, the source data can be transmitted in an intermittent manner. In exemplary embodiments of the present invention, it may be useful to cache the files in pieces as they are being broadcast, and a receiver unit can then apply auto-correction or check-sum methods to ensure the quality of the download.

In exemplary embodiments of the present invention, once sufficient RFD blocks for a CCS Media File are received and accumulated, the receiver can, for example, invoke RFD decoding firmware to decode the RFD blocks into the original CCS Media File. For a large CCS Media File, this step may require many minutes of processing, but can, for example, occur in the background, invisible to the user. RFD blocks can also be combined with other data files if they fit together to make a larger file. For example, if the user downloaded a 5 minute segment of a 30 minute program, and then decided he wants the larger segment, the receiver can, for example, download the 25 minute segment and merge it with the 5 minute segment to make the full 30 minute program.

Figure 4:
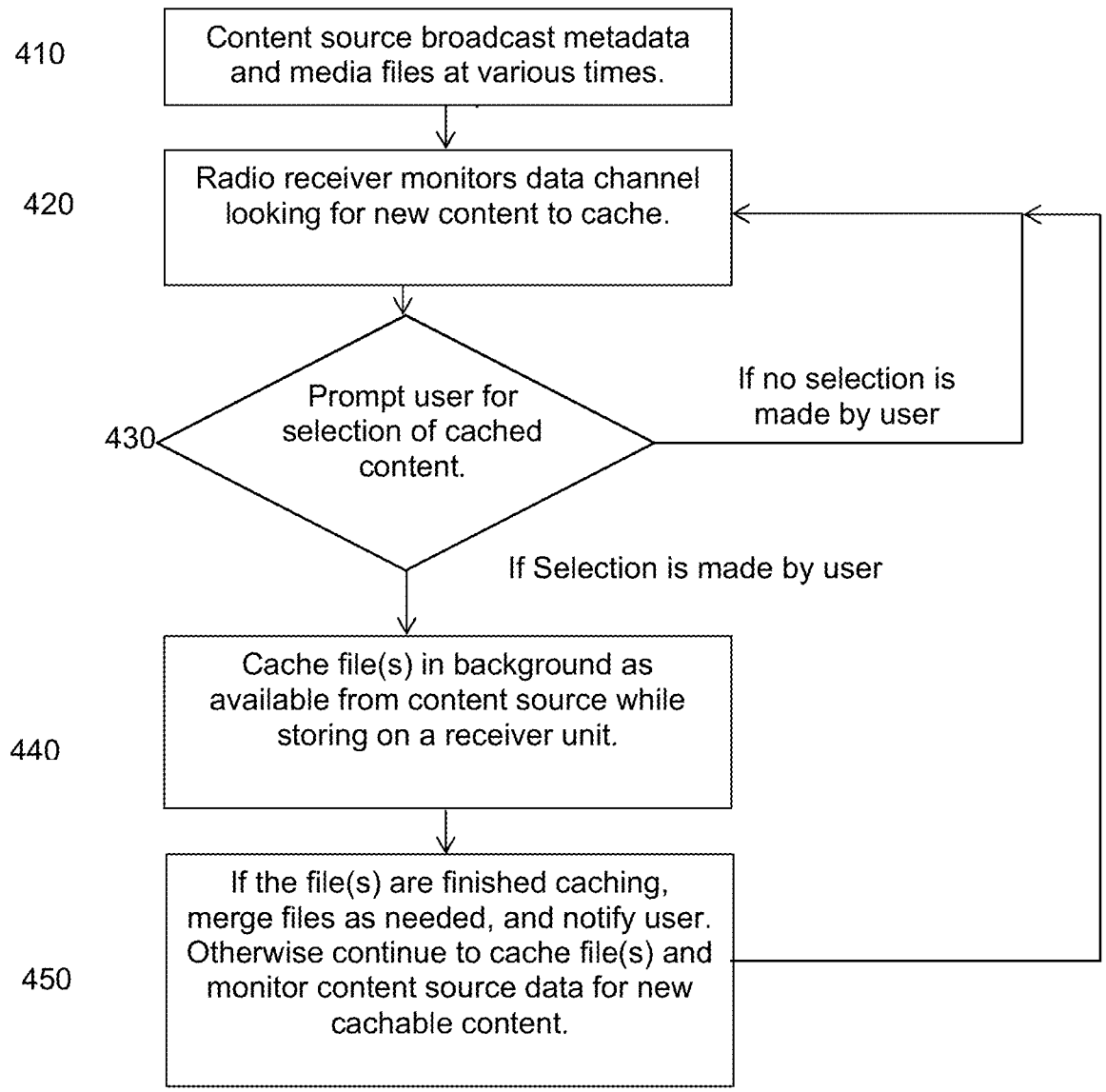
FIG. 4 depicts exemplary process flow for an exemplary content caching service.
Figure 5:
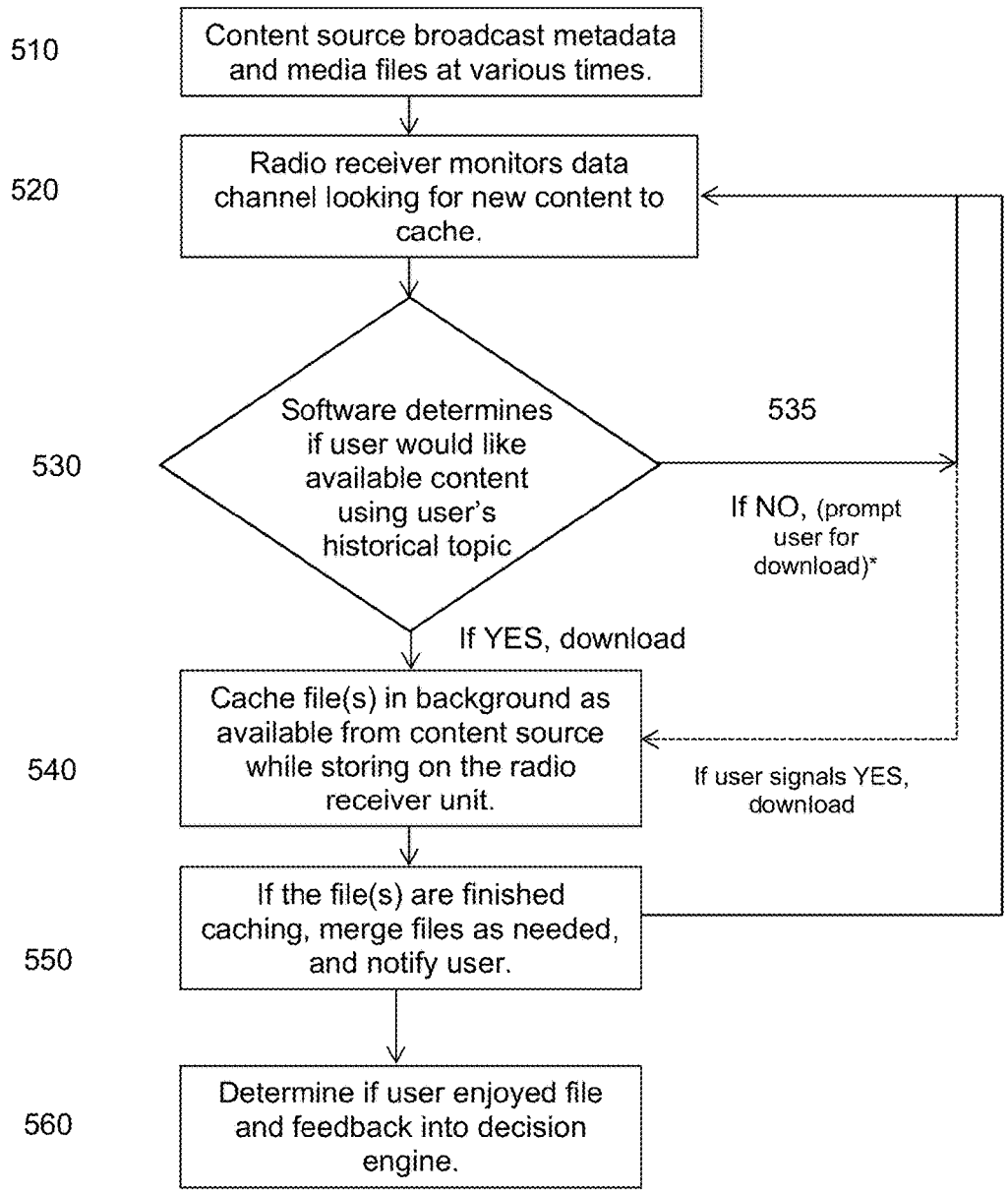
FIG. 5 depicts process flow for another exemplary implementation of content caching.

Following such downloading, a radio can, for example, alert a user to the availability of content in the decoded CCS Media File, thus allowing the user to play the constituent programs on demand from local radio memory. In exemplary embodiments of the present invention, a user can, for example, navigate through the content using an EPG-like user interface, providing details about each of the available programs. An exemplary method for implementing the Content Caching operation where the user selects downloads is depicted in FIG. 4, and process flow for an exemplary embodiment where intelligence on a radio receiver determines whether to download the content based upon a user's historical topic interest is depicted in FIG. 5. These exemplary methods are next described.

FIG. 4 illustrates downloading of files according to a content caching service based on user interaction. With reference thereto, process flow begins at 410 where the content source (either a satellite broadcast service, or, for example, an IP-based content streaming service) broadcasts media files and metadata at various times. Process flow moves to 420 where a radio receiver or other user device monitors data channels looking for new content to download. Upon identification of such new content, process flow moves to 430 where the user is prompted to select from available downloads. If no selection is made by the user, process flow returns to 420 and the radio receiver or other user device continues monitoring the data channels for new content. However, if at 430 a selection is made by a user (via a user interface, as described above), process flow moves to 440 and the file(s) is (are) downloaded in the background, as available from the content source and simultaneously stored on the receiver or user device. From there, process flow moves to 450 where, if the files have finished downloading, the files are merged, as needed, and the user notified. If the files have not finished downloading, then the user device continues to download the files, at which point process flow returns to 420 where the receiver or user device continues to monitor content source for new downloadable content.

FIG. 5 is a diagram of process flow for automatic downloading of available content, as described above. With reference thereto, process flow begins at 510 where the content source broadcasts media files and metadata at various times. From there, process flow moves to 520 where the radio receiver or other user device monitors one or more data channels looking for new content to download from the content source. At 530, logic (not a user as in the case of FIG. 4) resident on the receiver or user device then determines if the user associated with the receiver would like the available content based upon the user's interests/preferences, including listening history and topical interests and favorites. If yes, process flow moves to 540 and a download begins. If no, at 535, the user is prompted as to whether he or she desires to download the content (a second check on the automatic logic of the application). If yes, then process flow moves to 540. If no, then process flow returns to 520, and the receiver continues monitoring the data channel for new content. Continuing with reference to 540, assuming that there is a download, either based upon the automatic decision of the logic at 530 or based upon a user response to the prompt at 535, files are downloaded in the background as may be available from the content source, and stored on the receiver or other user device. From there, process flow moves to 550 where when the files are finished downloading, the files are merged as may be needed and the user notified of the availability of the content. Further, at 560, it can be determined if the user enjoyed the file, via, for example, prompts or action buttons and feedback can thus be supplied to the decision engine operating at 530. In exemplary embodiments of the present invention, such a feedback mechanism can, for example, be used to fine tune "user historical listening preferences." It is noted that such a step is optional, and need not be implemented in a given exemplary embodiment according to the present invention.

Exemplary Implementation

Figure 6:
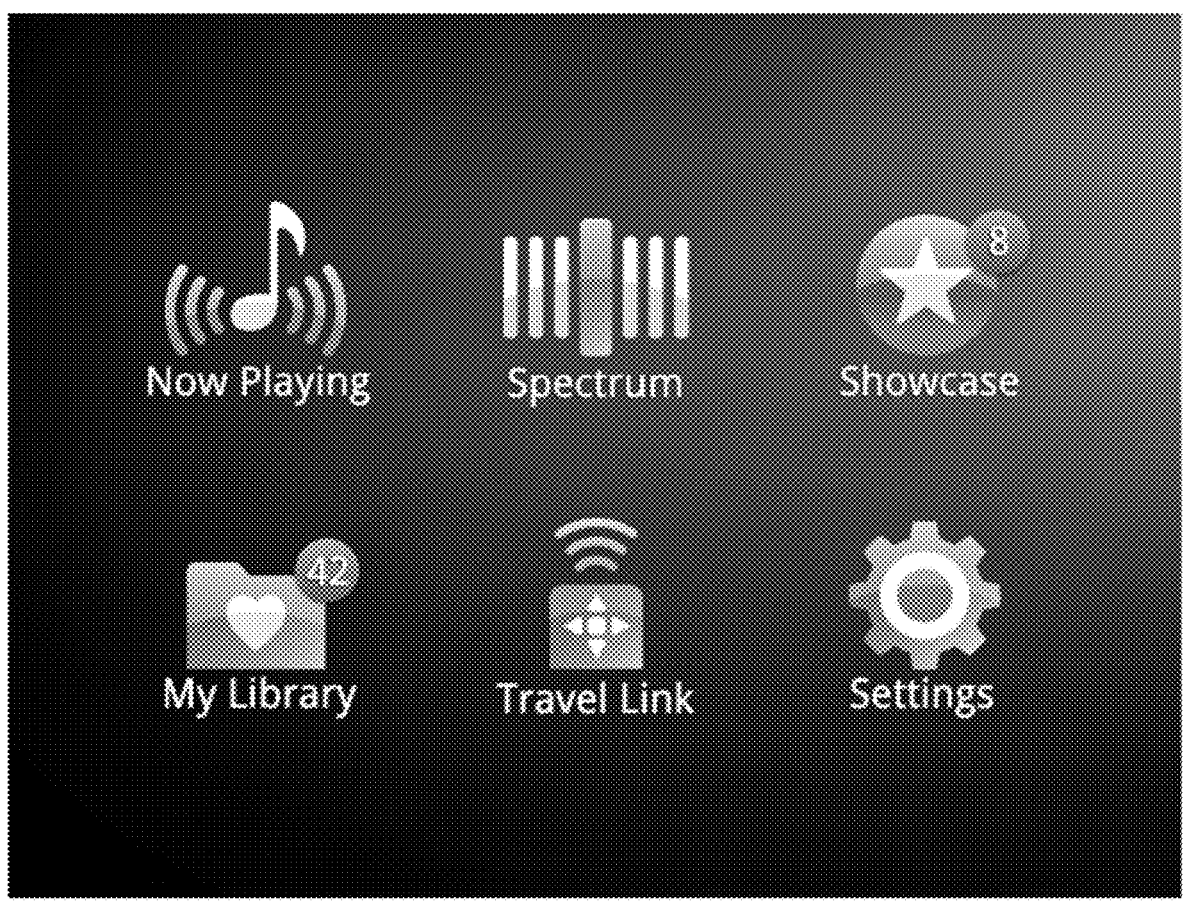
FIGS. 6-13 depict exemplary screen shots of an exemplary user interface through which a user can select and access cached content according to exemplary embodiments of the present invention.
Figure 7:
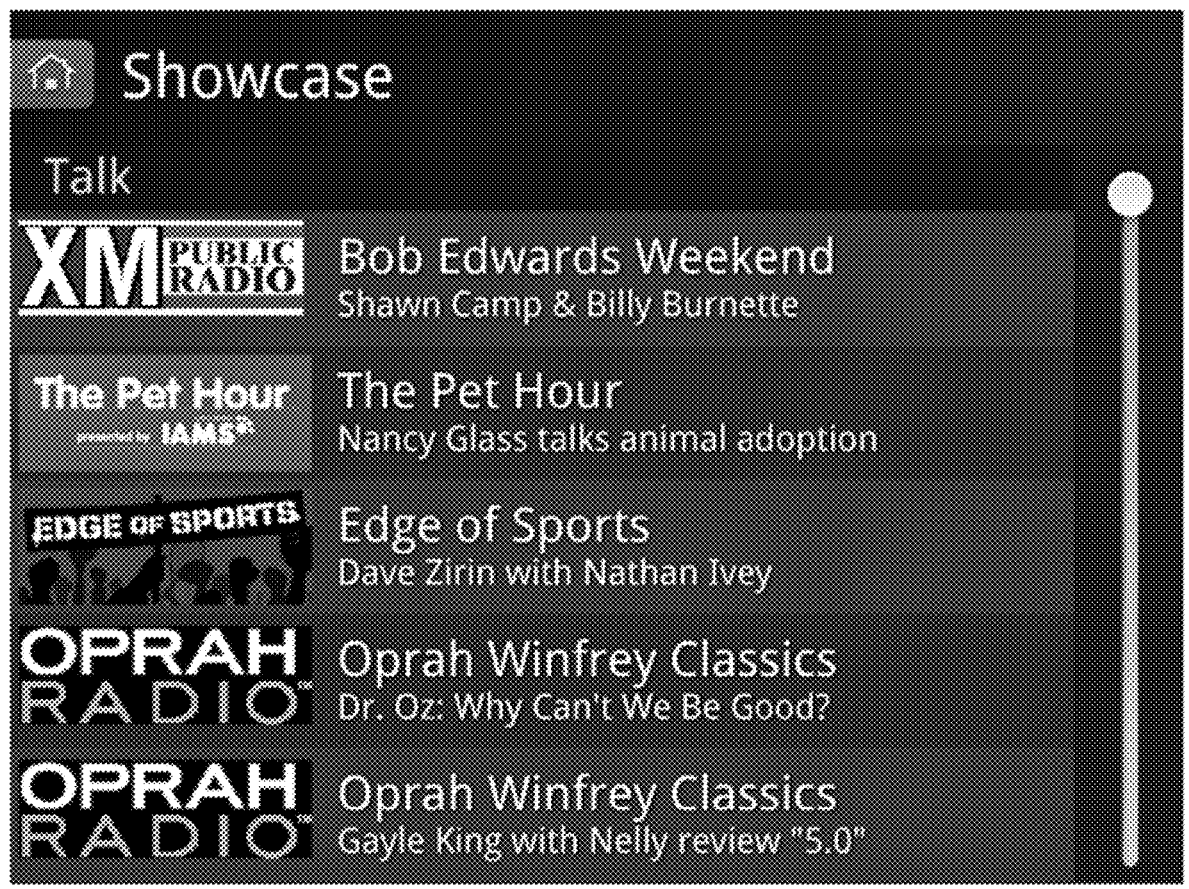
Figure 8:
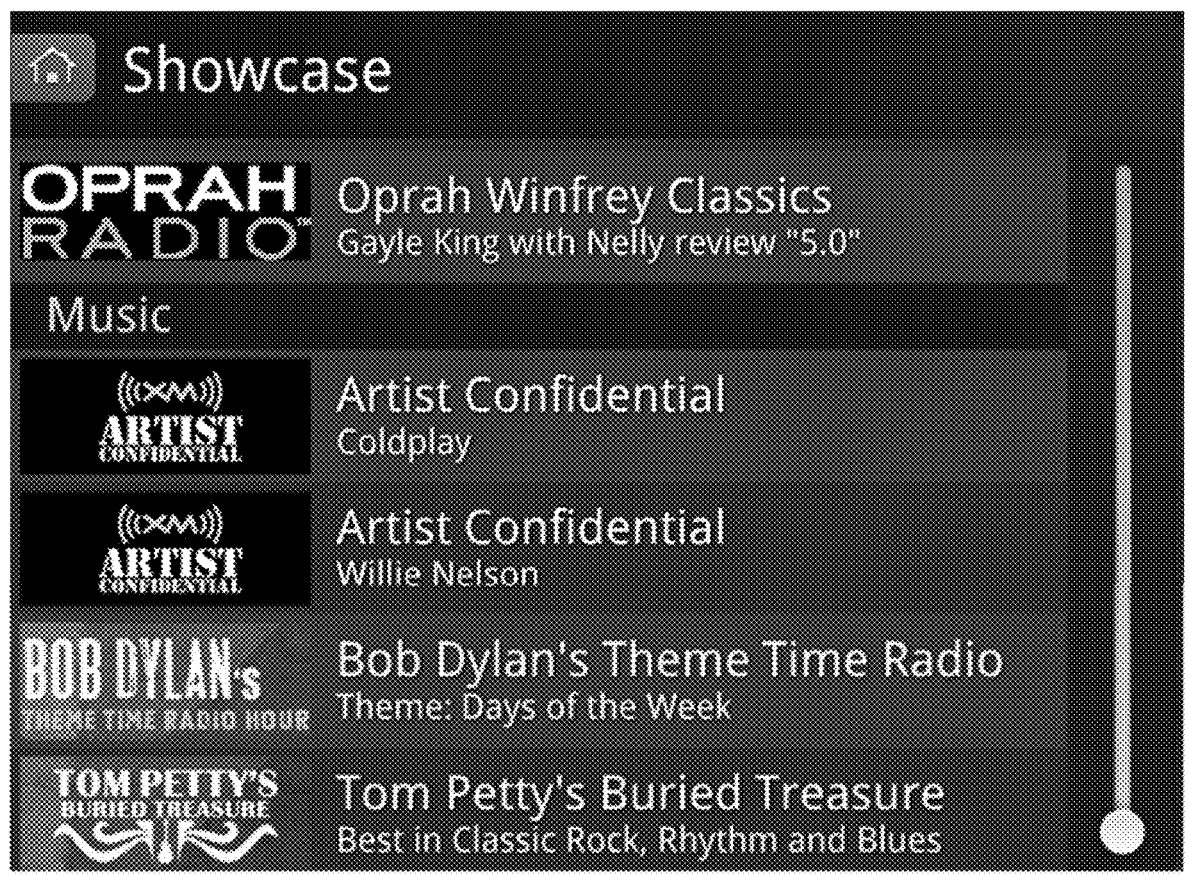
Figure 9:

FIGS. 6-13, next described, illustrate exemplary screen shots from an exemplary embodiment of the present invention. With reference thereto, FIG. 6 illustrates an exemplary Showcase Selection Icon. FIG. 7 depicts an exemplary menu of cached showcase content that a user may select for listening. FIG. 8 depicts the menu of FIG. 7, where the user has now scrolled down, and FIG. 9 illustrates an exemplary "Now Playing" Screen after the user has selected one of the Showcase titles for playback.

Figure 10:
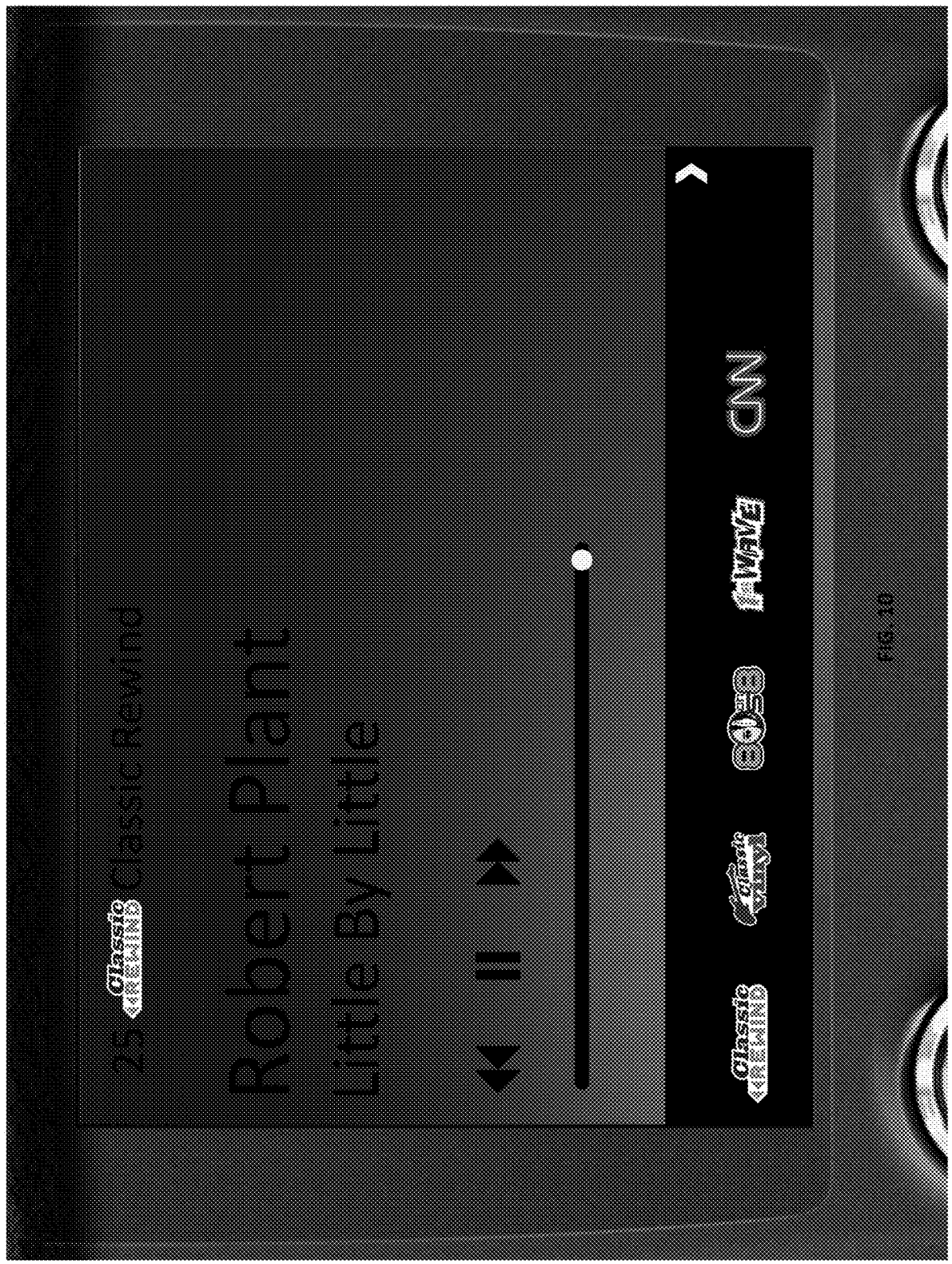
Figure 11:
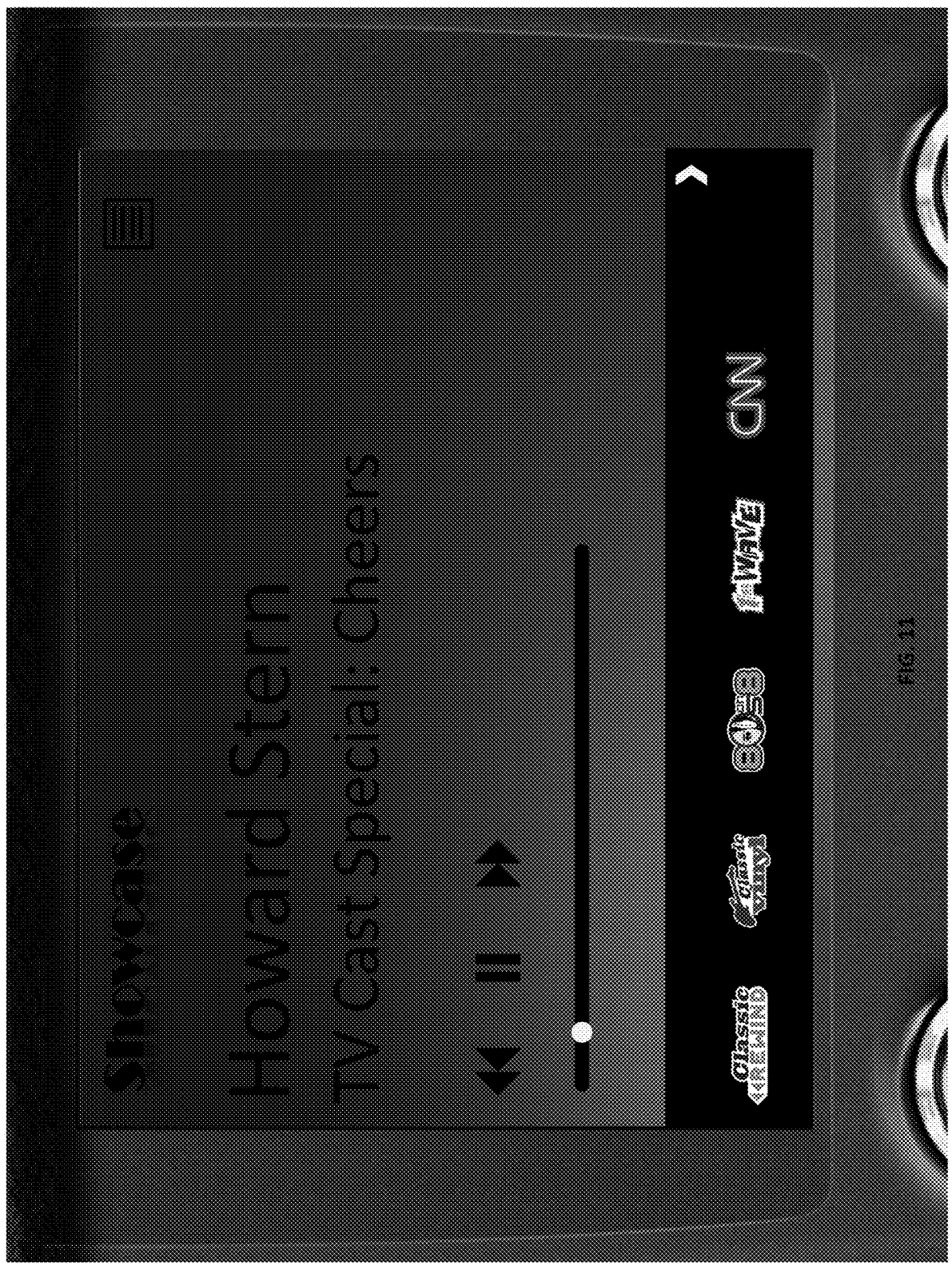
Figure 12:
Figure 13:
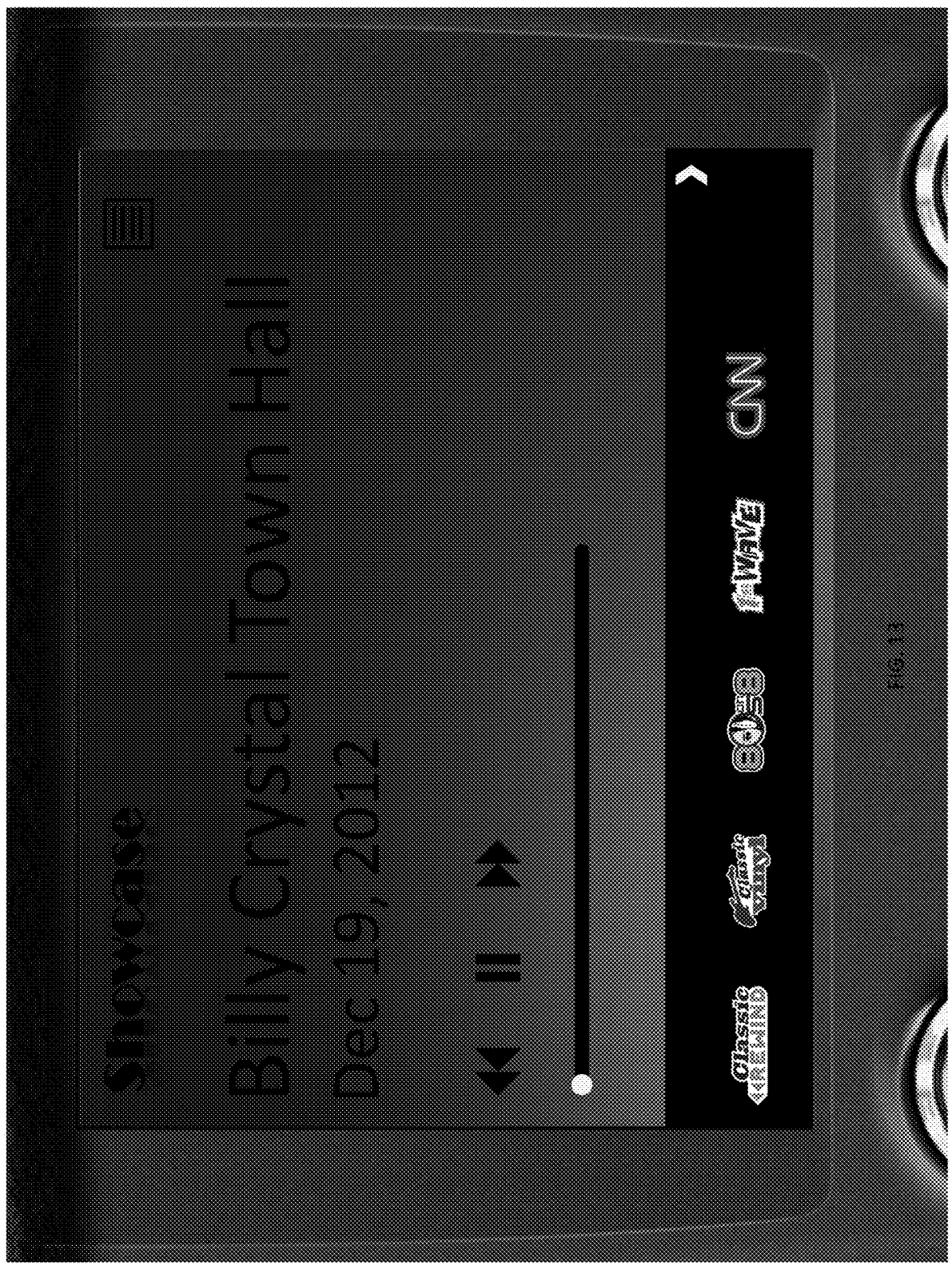

FIG. 10 depicts an exemplary screen shot seen by a user while listening to a radio channel of an Satellite Digital Audio Radio Service ("SDARS") system. The user is tuned to channel 25 "Classic Rewind." Visible at the bottom are other channels, including a "Showcase" channel. FIG. 11 depicts the user, having selected the Showcase, now receiving a special content item, a Howard Stern show. Visible in the upper right of the screen is an information button, pressing of which, for example, leads to the exemplary listing seen in FIG. 12.

From that exemplary listing, the user may choose a content item. Some are available (unlocked sign) and one is not available to this listener, for one of various system conditions, such as requires an enhanced subscription, for example, or, for example, has not fully downloaded, or the like. Upon choosing the first item, the Billy Crystal Town Hall performance of Dec. 19, 2012, the user is presented with FIG. 13, an exemplary User Interface allowing play, pause, fast forward and rewind through this content item.

Because Showcase offerings are downloaded to a user device, the user has compete ability to interact with any portion of the file that she chooses. Thus, unlike standard SDARS channels, a position bar and user control of listening is fully supported in Showcase functionality.

Continuing with reference to FIGS. 1-3, as noted, to implement Content Caching, a radio receiver 14 can receive data from a source content stream including, for example, the CCS data. A CCS Description File can thus be transmitted for each corresponding CCS Media File. As noted, CCS Description Files contain administrative and informative data for the overall Media File, as well as data about each of the programs in the Media File so that thorough information about a Media File's contents can, for example, be provided to a user without having to receive the Media File. The CCS Description data may include some, none, or all of the following pieces of information for the user information fields: Media File Display Name (for presentation to the user); and Media File Description (text summary of the Media File contents); Media File Logo (PNG or equivalent graphics file); Media File Topics (A list of topics applicable to the overall Media File contents, in the form of 10 bit integer topic indexes referring to topics defined by the EPG data services).

In exemplary embodiments of the present invention, CCS Description data can, for example, include some, none, or all of the following pieces of information for the administrative fields: Media File DSI (for example, a 10-bit Data Service Identifier, used by the receiver Host software to request reception of the corresponding Media File); Media File ID (a globally and persistently unique integer identifier assigned to this Media File); Media File Filename (text string with filename of the corresponding CCS Media File (this field matches the NAME field provided in the RFD Update File Metadata, so that the receiver can, for example, accurately match the transmitted CCS Media File data with this Description File information); Media File Size (integer containing the size of the Media File in bytes); Media File Transmission Start Time (time and date on which transmission of the Media File will (or did) begin); Media File Transmission End Time (time and date on which transmission of the Media File will end); and Media File Transmission Duration (an estimate in minutes of the total cumulative receive time required to receive enough RFD blocks to decode the Media File. It can be calculated by the feeder based on Media File size and the bandwidth allocated for transmitted this Media File. This field may be used by the receiver in heuristics to determine if there is sufficient time to receive the file given the remaining transmission time and the user's radio-on behaviors; as a result the user interface might completely suppress this Media File info, or generate a warning to the user that complete reception is in jeopardy without sufficient radio on time); and Media File Program Count (number of programs contained in the Media File).

In exemplary embodiments of the present invention, CCS Media Files can contain encoded audio content. CCS Media files can, for example, also contain embedded, time-synchronized metadata associated with the audio files, such as, for example, Artist/Title text and optionally extended metadata such as, for example, Song Tags. This data can, for example, be structured such that when a program encapsulated within a CCS Media File is played back, a receiver can properly implement time-synchronized metadata changes similar to behaviors that would occur for the original live broadcast of the program. In exemplary embodiments of the present invention, CCS Media files data can include some, none, or all of the following pieces of information for the user information fields for each program: Program Name (a Short Name, for use in constrained display space, and/or Long Name, for presentation in unconstrained display space); Program Description (text description of the program; Program Logo (PNG or equivalent graphics file for this program or alternatively, a separate, slower moving carousel may be used for referenced logos); Program Duration (length of the program); Program Broadcast History (optional reference to an original program broadcast time); and Program Broadcast Time (month, day, hour, and minute at which the program was broadcast); Program Broadcast Channel (channel on which program was broadcast); Program Topics (list of up topics associated with the program, in the form of 10 bit integer topic indexes referring to topics defined by the EPG data services.

In exemplary embodiments of the present invention, the CCS Media files data can, for example, include some, none, or all of the following pieces of information for the administrative fields for each program: CCS Program ID (integer identifier embedded in the CCS Media File used to identify and locate the media (e.g. compressed audio) associated with this program); Playback Restrictions (fields governing the play, disposition of the program, and other DRM issues including Max Play Count (max number of times this program may be played), Play Timeout (optional number of days after full receipt by the receiver, after which playback of this program is not allowed), and Expiration (optional time/date after which playback of this program is not allowed)); EPG Program Identifiers (identifiers used for cross-referencing the program to an EPG entry, if any, including EPG Series ID and EPG Episode ID); and On-Demand Identifier (identifier used for cross-referencing the program to specific On-Demand content managed by the IP-based services server, if applicable, or by a hybrid Sat/IP receiver to avoid unnecessary IP-based downloads of the same program as part of an On-Demand, Seasons Pass, Promo Pass or other service.).

In exemplary embodiments of the present invention, CCS Media Files can be transmitted using RFD, which can, for example, involve transmission of two separate data streams: (i) a RFD Update Metadata File, which can contain a small amount of metadata used to identify the RFD streams and provide decoding information to the receiver, and (ii) RFD Blocks, which can contain the bulk of the Media File, as a series of RFD blocks that can be accumulated by the receiver and eventually decoded into the original Media File.

The exemplary method described above for implementing Content Caching involves receiving information from a source content stream. Thus, a radio receiver 14 receives data from a source content stream, including CCS data. Receiver 14 can, for example, store the data in non-volatile memory, such as, for example, (HDD, flash or other storage media). Downloading the content data can take time. Thus, non-volatile memory storage of the data would be ideal.

In exemplary embodiments of the present invention, radio receiver application software can, for example, use a number of methods to determine whether to download the content. For example, a data stream provider can encode in the metadata an identification for download to all or some of the radio receiver receiving a broadcast. In exemplary embodiments of the present invention, radio receiver software can identify patterns for the user and identify topics the user might be interested in, and download content having the same Media File Topics identifier. In exemplary embodiments of the present invention, a user interface can, for example, download the CCS Description Files metadata, and create an EPG based the information and let a user decide which programs to download. Or, for example, a radio receiver can make another EPG based on a determination of which what programming the user may prefer. Determination of programming that a user may like can, for example, be based on what is in the favorites sections of the user interface, channel usage behavior, user survey, and/or other methodology.

For example, in exemplary embodiments of the present invention a recommendation algorithm, or program suggestion algorithm can be used.

It is noted that determination of which files are downloaded can be made, for example, based on the total cumulative receive time the receiver will be on during the period of data transmission, such that some "high priority" content, which is either or any of (a) relatively short duration content, (b) broadcast at a relatively higher data rate and/or (c) broadcast at a relatively higher repeat rate is received in preference to other "low priority" content that is either or any of (d) relatively long duration content, (e) broadcast at a relatively lower data rate and/or (f) broadcast at a relatively low repeat rate. In exemplary embodiments of the present invention, such determination can be implicit, i.e., a receiver naturally receives high priority content first, even if never receiving lower priority content due to limited cumulative receive time, or explicit, i.e., receiver firmware chooses to receive only the high priority content due to limited receiver storage and/or processing capacity.

Appendix A: Protocol Specification for Showcase Service

The following includes additional disclosure, including exemplary embodiments, features, systems, methods and algorithms relevant to the present invention. It is a revised version of a protocol specification for a proposed implementation of an embodiment of the present invention by Assignee hereof, Sirius XM Radio, within its XM Band, and thus refers to portions of the "SXM" broadcast service and system, as well as to the XM side of such service and system. Although the document provides for certain "Normative" features and processes, these are understood to refer solely to the exemplary embodiment described in this particular protocol specification, and is in no way intended to be limiting.

1. Scope (Normative)

This specification defines the protocol and implementation of the transmission of the Showcase Service over the XM Band of the Sirius XM Broadcast channel and also provides guidance for the reception decoding, storage and playback of the data for a receiving product.

This document is intended to be Normative and must be adhered to fully for compliant use of the service. Certain sections are labeled Informative, and contain background information, some of which may be Normative in other required specifications.

Within Normative sections, the terms "must" and "shall" denote required behavior of compliant implementation. Certain information is marked by a Compliance statement that indicates specific behavior to anticipate future protocol or service changes.

1.1 Number Formatting

This specification uses the following notations to indicate the numbering system base of the displayed number:

No prefix or suffix indicates a decimal number.

A number in single quotes, e.g. '01 1010' indicates a binary coded number.

A number with a 0x prefix, e.g. 0x1A, indicates a hexadecimal coded number.

1.3 Acronyms and Definitions

| | |
|---|---|
| AU | Access Unit. |
| DMI | Data Multiplex Identifier. |
| DSI | Data Stream Identifier. |
| LSB | Least Significant Bit. |
| MSB | Most Significant Bit. |
| RFU | Reserved for Future Use. |
| SDTP | SiriusXM Dynamic Transport Protocol. |
| SID | SiriusXM Service Identifier. A 10-bit integer which uniquely identifies a particular channel in the SXM bitstream. |
| Carousel | A method of delivering data in a unidirectional system that includes no means to request data. Data is delivered in a repeating loop that may include time gaps between the end of one loop of data and the beginning of the next loop. |
| Compliant | Obeys requirements. |
| Informative | Information provided for background purposes. |
| Normative | Information requiring receiver adherence for compliant use of the service. |
| May | Part of a non-mandatory normative statement. |
| Must | Part of a mandatory normative statement indicating a performance requirement. |
| Non-Volatile Memory | Persistent memory whose content is sustained through a power cycle. Examples are Flash, NV-RAM, and Hard Disk Drive. |
| Receiver | The combination of radio receiver and head unit. |
| Shall | Part of a mandatory normative statement indicating a functional requirement. |
| Should | Part of a mandatory normative statement that is dependent on a condition. E.g. If Y then X should. |

1.4 Reserved and Undefined Fields

This specification provides for the expansion of the service to include new features. Certain fields or values are labeled "Reserved" or "Undefined". Compliant receivers shall ignore these fields or values, except for the purpose of calculating the Packet and Access Unit check values.

2. Service Description (Informative)

The Sirius XM Showcase service provides the subscriber with a constantly refreshed package of short form audio content. Sirius XM will produce this content into Showcase programs that are transmitted over the SXM broadcast channel.

The Showcase service is targeted at SXM customers that spend at least 3 hours a week in their vehicles. Based on a survey conducted by SXM Marketing in April 2012, approximately 90% of SXM customers drive 3 hours per week or more in their primary vehicles. Leveraging this drive time, Showcase allows those customers to select from additional premium content that has been downloaded and stored in their vehicle while they are simultaneously listening to existing audio channels in real-time.

2.1 Service Features

Content is primarily talk format, but may include music format*

Showcase content will be supported by play, pause, rewind, fast forward and delete commands Showcase feature will be targeted to work on LCD screens as well as 2 line displays Requires module in the X65Hx family capable of decoding overlay bandwidth Service assumes non volatile storage is available in the receivers Initial target is 12 hours of talk content delivered over a rolling/offset 14 day schedule Customers driving less than 3 hours per week receive little or no Showcase content Customers driving 3 hours per week or more may expect to receive most, if not all, 12 hours of Showcase content in any two-week period There is no guarantee that any specific portion of Showcase content will be received by any given receiver FIG. 14 depicts a rolling 14 day schedule illustrating 24 hours of Showcase content delivery.

2.2 Service Elements

Figure 15:
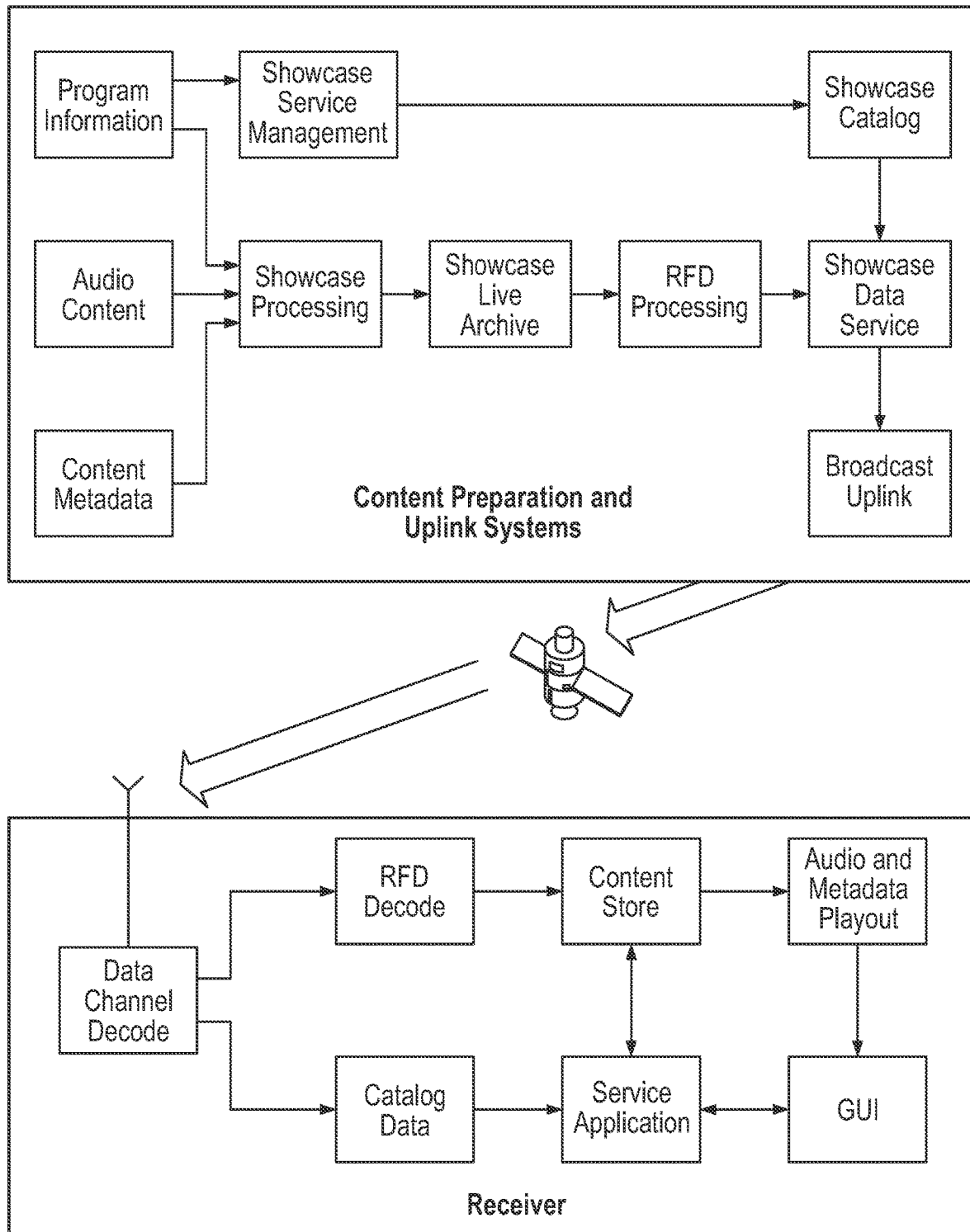
FIG. 15 presents an overview of an exemplary content caching or "Showcase" service according to exemplary embodiments of the present invention.

An overview of the Showcase service is shown in FIG. 15. With reference thereto, the Showcase Service contains two elements, Showcase Content containing the actual Showcase Programs and a Showcase Catalog that contains management information for each of the Programs active in the service.

2.2.1 Showcase Content

SXM stores all of its raw content and programming in an archive. Each piece of content in the Archive is a Track which consists of the Audio and its associated metadata. Showcase Programs are created by assembling one or more of these Tracks from the archive and adding Program level information. These programs can based on Tracks of original content or on Tracks of previously aired programming. SXM's programming staff will use the content of this archive to develop programs specifically for showcase.

Figure 16:
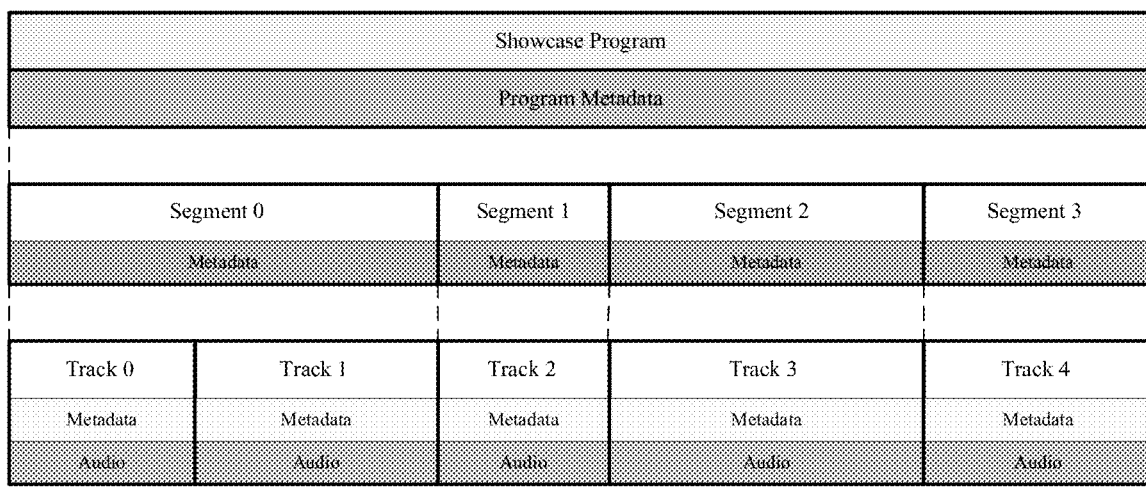
FIG. 16 presents an example of a Showcase program according to exemplary embodiments of the present invention.

A Showcase Program is assembled from one or more tracks of content. An example of a Showcase Program is shown in FIG. 16. The Program has Program Metadata that applies to the whole program. This Metadata includes: The Title of the Program, and A Description of the Program Each Track included in the Program has its own set of metadata which may include:

Artist Name

Content Title

Composer

Album

These, and additional fields are defined in this specification.

Additionally a content Track or Tracks may form a Program Segment as shown in FIG. 16. A Program Segment may also have its own metadata that provides a description of the Segment.

SXM packages a Showcase Program into a Showcase Program File for transmission to the user. The Showcase Program File is structured as shown in FIG. 17. The Showcase Program File contains all of the Showcase Program in a series of concatenated sub-files.

The Showcase File Header contains index information that defines the type and location of all of the other sub-files within the Showcase Program File The Metadata File contains the metadata for the file and its contents formatted in a way that allows easy access to the metadata associated with each track. It also contains references to text and artwork that make up parts of the metadata, but are contained within other sub-files.

The Compressed Text File contains the text strings that are part of the metadata for the Showcase Program. This text strings include such things as the Program Name, Program Descriptions, Segment Descriptions, and Track Title and Artist information. Metadata entries in the Metadata file reference these text strings.

Each Audio Track in the Showcase Program forms a Compressed Audio File within the Showcase Program File.

Artwork associated with the Program or Tracks within the Program are included in individual Artwork Files. These Artwork Files are referenced in the Metadata File.

All Showcase Program Files may be broadcast using Rapid File Delivery ("RFD") coding, a means of rapidly sending files used by Sirius XM Radio. A single Showcase Program File may exceed the maximum size supported by the RFD protocol so a Program File may be split into a number of Fragments which must all be received and decoded to reconstitute the single Showcase Program. This Fragmentation is supported by the RFD specification.

Figure 18:
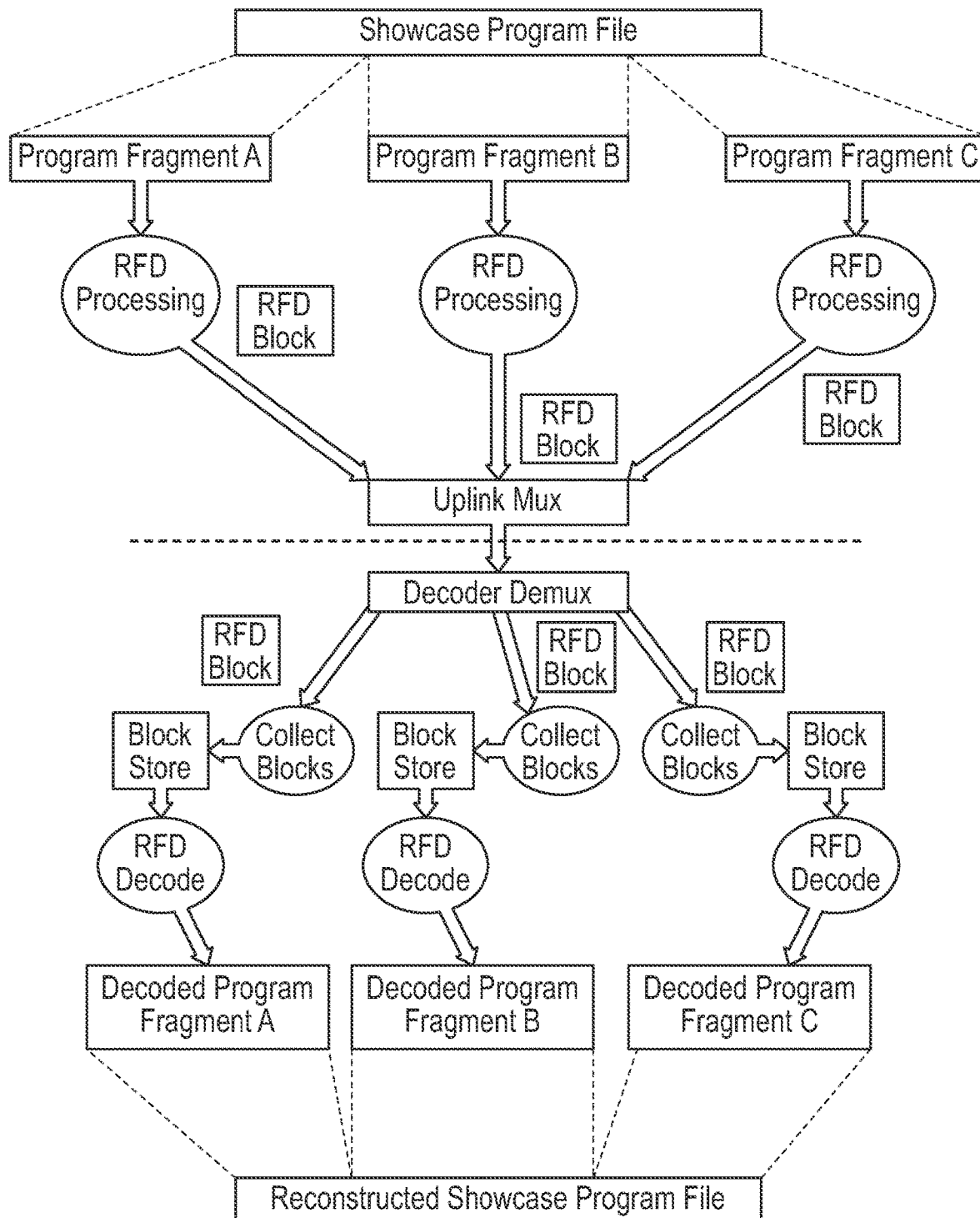
FIG. 18 illustrates an example of the fragmentation of showcase programming according to exemplary embodiments of the present invention.

An example of the Fragmentation of Showcase Programming for RFD transmission is shown in FIG. 18. In this example a Showcase Program File is split into 3 Fragments. Each Fragment is RFD processed separately and each RFD process generates RFD blocks which are then multiplexed into the broadcast. RFD Metadata, included in the Showcase Catalog, identifies where in the data multiplex the RFD Blocks for each Fragment are located.

A receiver uses the RFD Metadata in the Showcase Catalog to identify the RFD blocks for each Fragment in the data multiplex. RFD Blocks for each Fragment are parsed and processed separately.

The receiver must collect the RFD Blocks for each Fragment of a program and determine, for each Fragment, when it has enough unique blocks to decode a Fragment. When it has decoded all of the Fragments for a Showcase Program it can reconstruct the Showcase Program File.

The reconstructed Showcase Program File is formatted as shown in FIG. 17. The receiver can use the header information to identify all of the sub-files to be stored for later playback.

2.2.2 Showcase Catalog

The Showcase Catalog is used to manage all of the content that is currently active in the service. Currently active content is Showcase Programs that are currently being delivered over the broadcast channel and previously delivered Programs that may still be stored in the receiver.

The Catalog information includes:

Availability start and end dates for the Program

Access control information that a receiver can use to determine if it can display and playback the Program Digital Rights Management information RFD Metadata if the Program is still part of the RFD broadcast.

Links to Program or Series entries in the SXM EPG service. (The EPG service is not required for compliant operation of the Showcase Service.

A full description of the Catalog information is provided in Section 4, below.

2.3 Showcase Content Lifecycle

Figure 19:
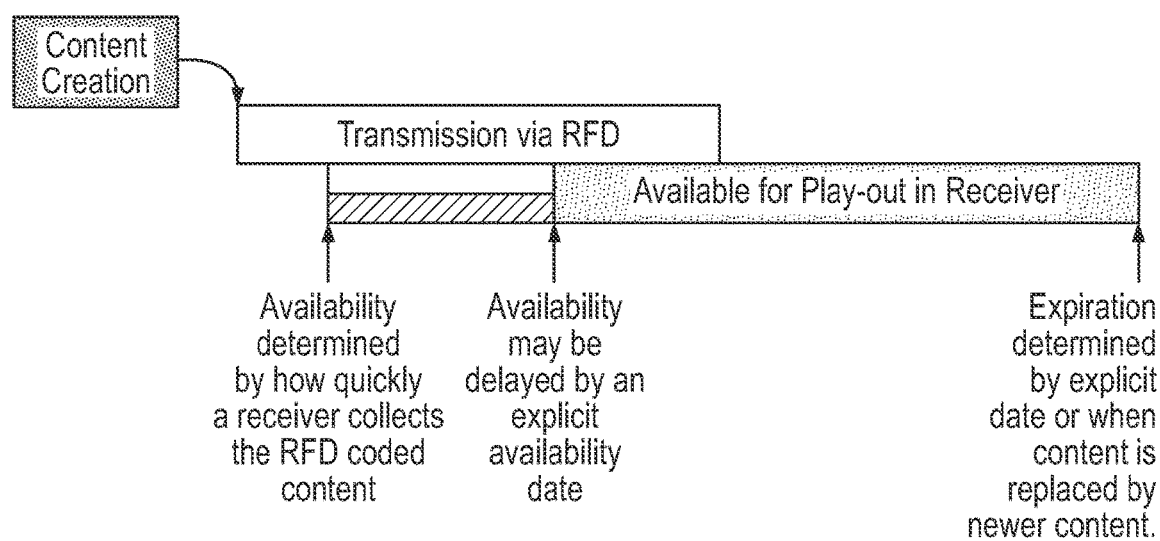
FIG. 19 illustrates a typical lifecycle for Showcase content according to exemplary embodiments of the present invention.

A typical lifecycle for Showcase content is shown in FIG. 19.

1. Showcase content is created by SXM
2. The content is transmitted via RFD. The period of time that content is transmitted may vary over the life of the service but is set for a duration that ensures that a typical subscriber is able to receive and decode the content. Content is usually transmitted for a number of days.
3. Content becomes available in a receiver. The earliest that a piece of content becomes available is determined by the amount of time a receiver is turned on and collecting the RFD transmission. Someone who drives for a number of hours each day will receive the new content faster than someone who drives for a few minutes each day
4. Content expires and is deleted from the receiver. The time at which a piece of content is deleted from a receiver can be based on an explicit date delivered with the Catalog information or can occur when newer content displaces the currently stored content.

2.3.1 Service Load

The intent of this service is to provide a constantly refreshed range of Showcase Programs available in the receiver. The service is targeted to broadcast 12 hours of new content every 2 weeks, as shown in FIG. 15. That 12 hours of programming may comprise up to 48 Program Fragments, which a receiver must be able to process. When each Program or Programs reaches the end of its broadcast period it is removed from the carousel of RFD encoded data and is replaced by the next Program or Programs.

2.4 Content Playback

Figure 20:
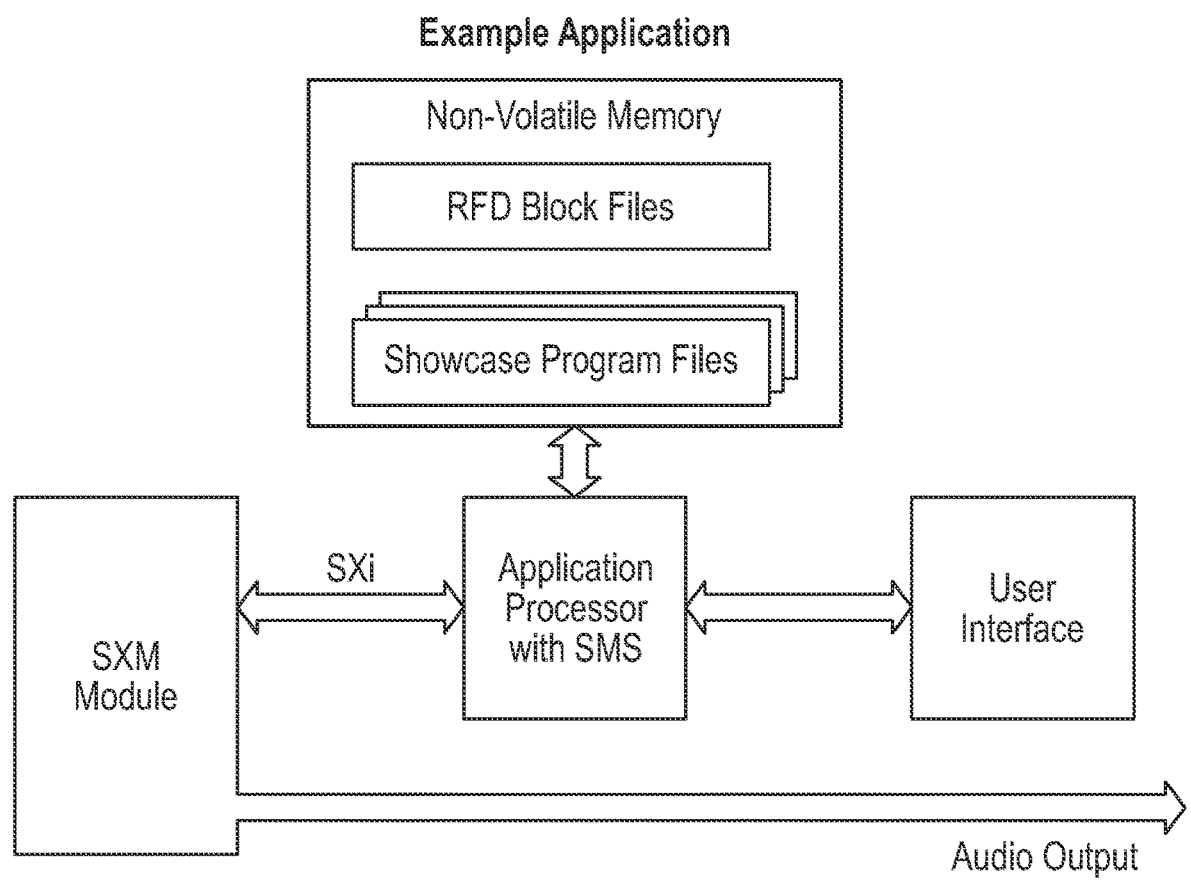
FIG. 20 illustrates an exemplary receiver implementation for a Showcase service according to exemplary embodiments of the present invention.

A typical receiver implementation is shown in FIG. 20. In this example the SXM module is responsible for receiving and decoding the SXM signal. It provides RFD Blocks of Showcase Programming and the Showcase Catalog carousel to the Application Processor via the SXi interface.

In this example the Application Processor is responsible for decoding the Catalog information and determining the status of content currently stored in the receiver. The Catalog information controls when content can be made available and when it must be deleted from a receiver. It also provides subscription information for each Showcase Program that a Application Processor must use to determine if it has access to the content. The Application processor is responsible for storing and decoding the RFD Blocks and then assembling the complete Showcase Program Files.

The Application Processor is responsible for storing the Showcase Program Files in its non-volatile memory. The specification does not provide guidance on how the files should be stored since this may vary across applications.

It is expected that receivers of various levels of User Interface capability will be developed that support the Showcase capability and the service provide data that supports these various receivers.

The combination of Catalog information and program metadata for each Showcase Program provides information that can be used to generate a list of the available Showcase Programs in the receiver.

Selecting an item on the list may reveal additional Program Metadata information such as a description of the Program and Program level Artwork (if available)

Selecting a Showcase Program for playback would cause the Application to access the stored Showcase Program and use the SXi interface to send the compressed audio files, in playback order to the SXM Module. The Module uses the SXi interface to control the rate of transfer of the compressed audio data so that it keeps a buffer of audio while it plays out the content. The SXM Module is responsible for decoding the compressed audio to baseband audio for output to the receivers audio system. The Application Processor accesses the Metadata file the Showcase Program and presents the required metadata to the UI such that it is synchronized with the Audio Output.

This architecture supports all typical playback features, pause, fast forward, rewind, etc of the Record feature.

3. Transmission 3.1. Transport Service

The data channel interface from the SiriusXM receiver or SiriusXM baseband decoder may consist of a serial interface.

The service payloads may be carried over the SDTP protocol. Within the data stream, data are transmitted most significant bit first. The first protocol bit is the 0x80 bit of the first received byte; the second is the 0x40 bit and so on. Protocol Table entries are transmitted according to the Item field defined in the Protocol Table. Character strings are transmitted left-most symbol first.

3.2 Service Definition

The target maximum repetition time for the RFD Metadata Carousel is 5 minutes.

3.3 Access Units

The Showcase Data Service uses multi-packet SDTP Access Units to convey the data carousels.

The maximum size of any Access Unit is 5120 bytes.

Each Access Unit contains data from only one carousel type.

3.3.1 Protocol Version Number

The Protocol Version Number, or 'PVN' occupies 4 bits in the header of each Access Unit. It refers to the Protocol Version in use for a particular Access Unit within a data service, and specifies the format of the payload type in the message that follows (for the fields that follow). This feature allows SiriusXM to add new Access Unit formats to existing data streams, where new receivers can parse them, while older ones ignore them.

If the PVN field of an Access Unit is different from the one defined in this document, then the contents of the Access Unit will contain syntax not decodable by a receiver compliant with this specification. Receivers shall process all Access Units to the point where the PVN is located. If the PVN value of the Access Unit is not valid for this specification then the entire Access Unit is discarded.

The PVN Value for this specification is '0001'.

3.3.2 Carousel IDs

Table 1 lists the carousel IDs that are used in the service.

TABLE 1

CARID Assignment

| Carousel ID | PVN | Data Type |
|---|---|---|
| 0 | 1 | Showcase Catalog Carousel |
| 1 | 1 | Showcase File Carousels |
| 2-15 | — | Reserved for Future Use |

A 32-bit CRC value is calculated over the Access Unit and placed in the last four bytes of the Access Unit. This allows the receiver to validate the data in the Access Unit. The CRC shall be calculated using the following polynomial:

$$x^{32}+x^{26}+x^{23}+x^{22}+x^{16}+x^{12}+x^{11}+x^{10}+x^8+x^7+x^5+x^4+x^2+x+1$$

with an initial residue of 0xffffffff and inversion (one's complement) after all the bytes have been processed. Bytes are processed from the least significant bit to the most significant bit, and the least significant bit of the CRC is the coefficient of the $x^{31}$ term. This is equivalent to a 32-bit table generator of 0xedb88320, for example.

The CRC value shall be checked before any other field in the Access Unit. A receiver shall ignore any AU whose check value does not match the calculated value.

3.4 Presence Flag

Some fields defined in this specification may not always be present in the bitstream. The presence of such a field is indicated by a single-bit Presence Flag, immediately before the field's place in the bitstream. When set to '1' the Presence Flag indicates that the subsequent field is present. When set to '0', the field is not present.

The use of the Presence Flag is indicated by an "F+" added to the start of the field name, in the following tables.

3.5 DSI Assignments

The Showcase Service is assigned to DSI=810 on the XM band.

The DSI for the Showcase Service shall use a maximum of 4 DMIs for the lifetime of the service. Carousel 0 will appear on a single DMI. Carousel 1 may appear on more than one DMI.

4. Showcase Catalog Carousel (CARID=0)

The Showcase Catalog Carousel provides access and management information for Showcase Programs that are active within the service and present within the content lifecycle.

4.1 Access Unit Header

TABLE 2

AU Header

| Order | Label | Size in Bits | Comments |
|---|---|---|---|
| 1 | PVN | 4 | Protocol Version Number (= 1) |
| 2 | CARID | 4 | Carousel ID = 0 as defined in Section 3.3.2 |
| 3 | VERSION | 16 | Version of the Carousel |
| 4 | AUTOT | 4 | AU Total |
| 5 | AUCT | 4 | AU Sequence Number |

4.1.1 PVN

The PVN field always contains the value '0001' to identify this AU as conforming to version 1 of the Showcase Service.

4.1.2 CARID

The CARID field always contains the value '0000' to identify this carousel as the Showcase Catalog Carousel.

4.1.3 VERSION

VERSION is a 16 bit value that contains the version of the Catalog Carousel. The version number increments each time the contents of the carousel changes.

4.1.4 Access Unit Total (AUTOT)

AUTOT is a 4 bit field that indicates the number of Access Units used to transmit the Showcase Catalog. The number of Access Units is [AUTOT]+1.

4.1.5 Access Unit Count (AUCT)

AUCT is a bit field that provides the sequence number of this Access Unit in the Group of Access Units defined in 4.1.4

A receiver may use the AUCT and AUTOT information to determine if it has collected all of the available data for the Showcase Catalog.

AUCT is valid in the range 0 to AUTOT.

4.2 Showcase Catalog Payload

The Showcase Catalog Payload contains status and control information for all Showcase Programs currently active in the service.

TABLE 3

Catalog Payload

| Order | Label | Size in Bits | Comments |
|---|---|---|---|
| 1 | PROGNO | 16 | Number of Programs listed in the service |
| Repeat 2-11 loop PROGNO times | | | |
| 2 | SHOWID | 16 | Unique Showcase ID |
| 3 | SUBCH | 10 | Subscriber Channel |
| 4 | DISCH | 10 | Display Channel |
| 5 | DRM | 8 | Digital Rights |
| 6 | AVAIL | 14 | Date Content First Available |
| 7 | ENDDATE | 14 | Date Content No Longer Available |
| 8 | LIST | 8 | List Order |
| 9 | STORAGE | 8 | Storage Priority |
| 10 | F + EPG | 1 + 33 | Link to EPG Entry |
| 11 | RFD | 1 | RFD Metadata Present for this entry |
| If RFD = 1 then Items 12-23 are present, These items are fully defined in [7] | | | |
| 12 | SIZE | 32 | Total size of all the Update files in Bytes |
| 13 | CAR | 4 | Carousel of Update files |
| 14 | ALG | 3 | Block Coding Algorithm |
| 15 | COMP | 3 | Compression Algorithm |
| 16 | LIFE | 14 | Lifetime (days since 2009 Jan. 1) |
| 17 | NUMFRAGS | 4 | Number of File Fragments − 1 |
| Repeat the 18, 19, 20, and 21 combination NUMFRAGS times | | | |
| 18 | ID | 16 | File Fragment Identifier in the Carousel |
| 19 | BLKSIZE | 14 | Size of Data Blocks for this RFD File Fragment. |
| 20 | FRAGSIZE | 24 | Size of this RFD File Fragment in bytes |
| 21 | CRC | 32 | CRC of this RFD File Fragment |
| 22 | F + EXTL | 1 + 7 | Additional data in bytes |
| 23 | EXT | 8*EXTL | Additional data |

4.2.1 PROGNO

PROGNO indicates the Number of Showcase Programs currently active in the service, and listed in this catalog. The number of active Programs is [PROGNO]+1. There may be a maximum of TBD Programs active in the Showcase service at any time.

4.2.2 SHOWID

SHOWID is a 16 bit value that is a unique identifier for a Program in the Showcase service. It is linked to the SHOWID value in the Program Metadata.

4.2.3 SUBCH

SUBCH is a 10 bit value that contains the SID of the channel that the Showcase Program is associated for subscription purposes. If a receiver is not subscribed to the channel defined in SUBCH then the receiver should not collect, decode or display for playback the Showcase Program.

If a previously decoded Showcase Program changes its SUBCH to a channel that the receiver is not subscribed then a compliant receiver must make the content unavailable to the user.

4.2.4 DISCH

DISCH is a 10 bit value that contains the SID of the channel to which the Showcase Program is associated for presentation purposes. When displaying information on a Showcase Program the receiver should use the channel identified by this SID instead of the SID carried in SUBCH.

The channel indicated by the DISCH value is a channel that contains similar content to that in the Showcase Program. If the content in the Showcase Program were highlights of the Howard Stern show then the SID value in DISCH would that for the channel Howard 100.

4.2.5 DRM

The DRM bits are TBD at this point but will be used to control a receivers ability to use the content.

4.2.6 AVAIL

The AVAIL field specifies the first day on which the content can be made available on the receiver. Some content may be transmitted with an AVAIL data sometime in the future. A compliant receiver will still collect and store this content but will not make it available in its UI until the defined date in this field. The value is coded as the number of days since some chosen January 1.

4.2.7 ENDDATE

The ENDDATE field specifies the last day on which the content will be made available on the receiver. Content shall be deleted on this date. A receiver may use this date in the UI to indicate how long a Program will be available. The value is coded as the number of days since some chosen January 1.

4.2.8 LIST

LIST provides a List order Priority for the Program, with the highest value 0xff having the highest priority. This may be used by the receiver to determine the list order of the content. This value provides service control of the order in which the Showcase content is listed. The most popular shows would be given a high value and would be listed first, with lower value content appearing further down the list.

Priority Order is one way to display the Showcase Programs. Other valid ways of displaying the content is by Display Channel order or by Title (alphabetically)

4.2.9 STORAGE

STORAGE provides a storage resource priority for content. If a receiver cannot store all of the programming it can use this value as part of its decision in identifying which content to delete. The higher the STORAGE value, the more important the content. The lower value content should be deleted first.

4.2.10 F+EPG

EPG is a 33 bit value which links the Showcase Program to a an entry or entries in the Broadcast EPG. This may be used with the UI to indicate in the EPG that there is Showcase Program associated with a Broadcast Program or Series.

TABLE 4

EPG Field

| EPG MSB | EPG 32 LSBs |
| --- | --- |
| 0 | The 32 LSBs of the EPG field contain a value that matches a SERID value in the EPG service that identifies a series of programs. This links this Showcase Program to that Broadcast Series |
| 1 | The 32 LSBs of the EPG field contain a value that matches a PROGID value in the EPG service that identifies a Program. This links this Showcase Program to that Broadcast Program. |

4.2.11 RFD

The RFD bit indicates if the Program is currently part of the transmission of content on the Showcase Files carousels.

If RFD is '0' then the Program is no longer a part of the Showcase Files carousel, but is still active in the service. In this case Items 12-23 of Table 3 are not present for this Program entry.

If the RFD bit is '1' then the Program is part of the Showcase Files carousel, and Items 12-23 are present for this Program entry.

4.2.12 RFD Metadata Fields

If the Showcase Program is part of the broadcast in the Showcase File Carousel then the RFD Metadata required to find and decode that content is present in the Catalog entry for that program. These constitute items 12-23 of Table 3.

These RFD fields are identical to the RFD Metadata fields defined in [7]. The latest version of this document defines the use of the EXT data in the entry to contain the DMI on which the Showcase File carousel is carried.

5. Showcase Files (CARID 1)

Figure 21:
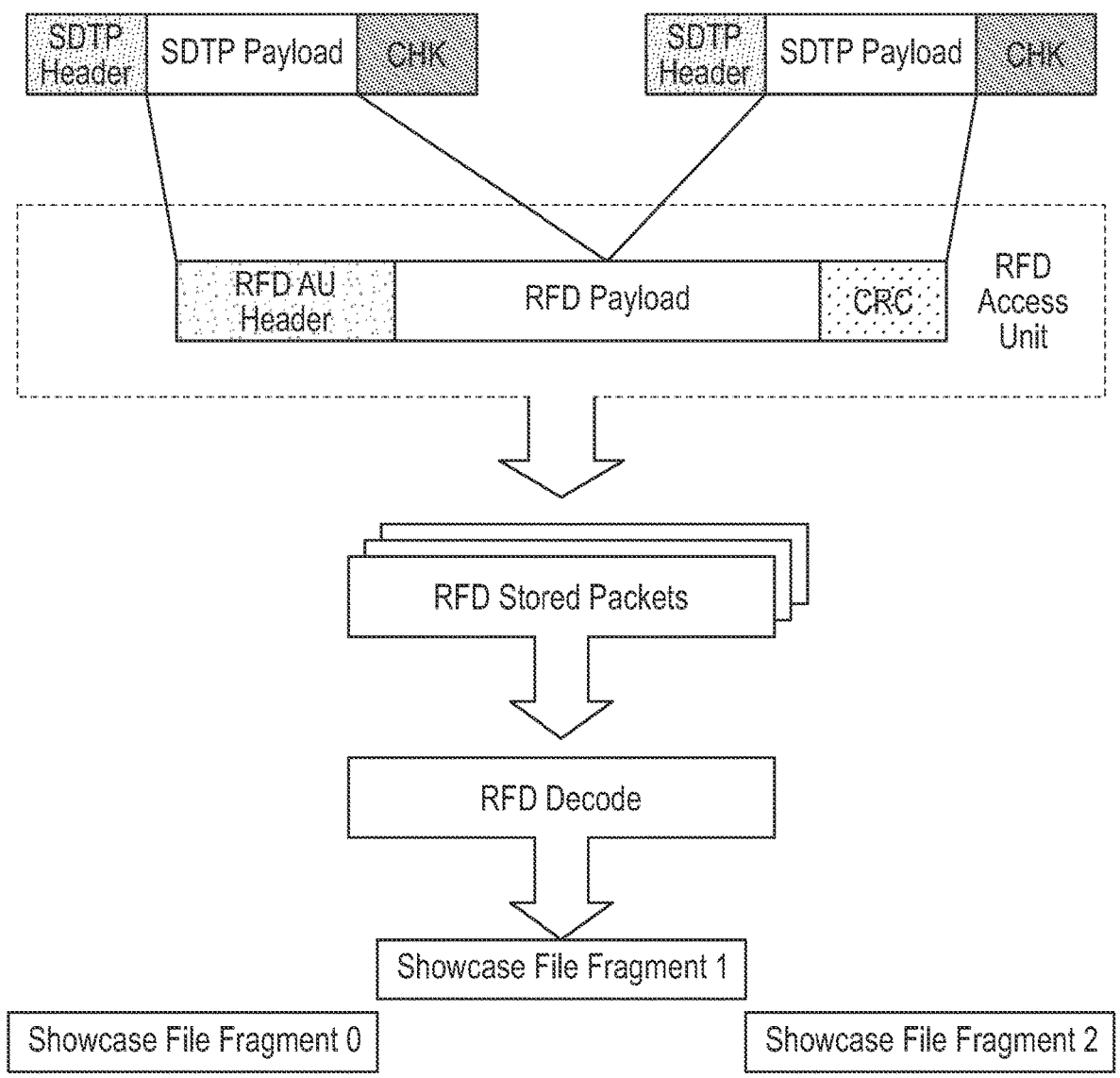
FIG. 21 depicts an exemplary file decode process according to exemplary embodiments of the present invention.

Showcase content is sent as files coded using the RFD process, for example, as shown in FIG. 21. As shown therein, a Showcase File may be divided into one or more Fragments for the purposes of RFD processing.

A receiver accumulates a series of SDTP packets and uses the payload of the packets to assemble an RFD Access Unit. The payload of the Access Unit forms an RFD block from a Fragment of the file. The receiver accumulates enough RFD blocks from a fragment to run the RFD decode algorithm and retrieve the File Fragment.

A receiver must collect all Fragments of a Showcase File to be able to display and play the Showcase content in the file.

5.1 RFD Access Units

The RFD blocks are delivered using Access Units as shown above in FIG. 21.

5.1.1. RFD Access Unit Header

The RFD Access Unit header carries information to indicate that the payload of the Access Unit contains the RFD blocks for Showcase Files.

TABLE 5

Service Information AU Header

| Order | Label | Size in Bits | Comments |
| --- | --- | --- | --- |
| 1 | PVN | 4 | Protocol Version Number (= 1) |
| 2 | CARID | 4 | Carousel ID as defined in Section 3.3.2 |

5.1.1.1 PVN

Has the value of 1 for this version of the specification, as noted above.

5.1.1.2 CARID

A Carousel ID of 1 indicates that this Access Unit contains Showcase Program Data 5.1.2 Showcase Program Data Payload The Update Data Payload of the Access Unit is data transmitted according to the RFD Protocol Specification described above. The payload from multiple Access units is processed by the RFD decoder in the receiver which then outputs the Map Image Update File.

5.2 Showcase File

Figure 22:
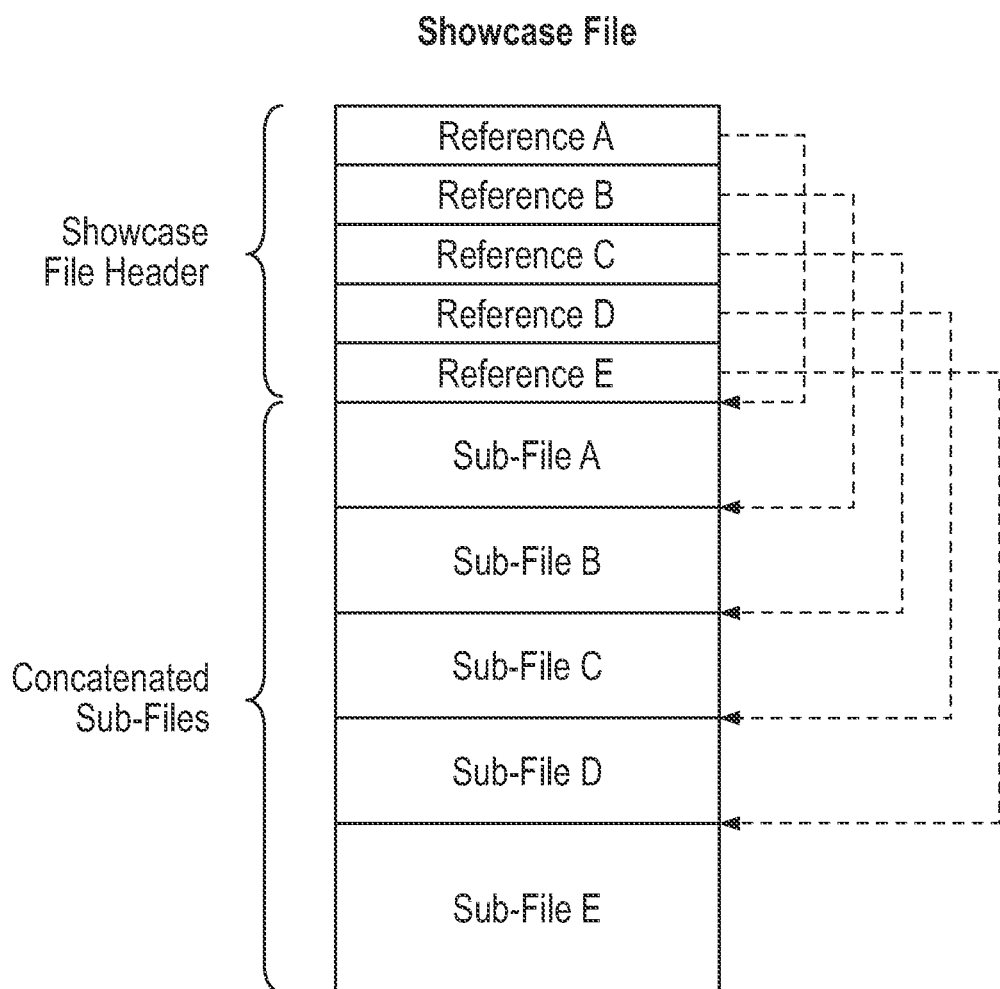
FIG. 22 depicts an exemplary file structure according to exemplary embodiments of the present invention.

The Showcase File, illustrated in FIG. 22, when reconstituted into a single file after RFD processing, and possibly the concatenation of Fragments, consists of a header that defines the sub-files in the payload, and a payload that is a concatenated series of Sub-Files.

5.2.1 Showcase File Header

The file starts with a file header defined in Table 6.

TABLE 6

Map Image File Header

| Item | Label | Size in Bits | Comments |
| --- | --- | --- | --- |
| 1 | Reserved | 6 | Reserved for Future Use |
| 2 | BRATE | 16 | Coding Bit Rate |
| 3 | FCOUNT | 10 | Count of sub-files in the Showcase File |
| 4 | FILE_TYPE | 4 | Sub-File Type |
| 5 | FILE_PARAM | 4 | Sub-File Identifier |
| 6 | FILE_OFFSET | 32 | Sub-File Offset (in Bytes) |

Items 3-5 repeat FCOUNT+1 times.

5.2.1.1 RESERVED BITS

6 Reserved bits are provided for future use. The contents of this field shall be ignored by compliant receivers 5.2.1.2 BRATE BRATE provides the coded bit rate of the compressed audio for this Showcase Program in bits per second. The LSB of BRATE represents 1 bps.

5.2.1.3 FCOUNT

The FCOUNT field contains the number of Sub-Files in the Showcase File, where FCOUNT+1 is the number of files.

5.2.1.4 FILE_TYPE

FILE_TYPE indicates the type of data within each Sub-File.

| FILE_TYPE | Sub-File Contents | Comment |
| --- | --- | --- |
| 0 | Program Metadata | Binary file containing Program Level and Content Metadata |
| 1 | Compressed Text | ZLIB compressed text file |
| 2 | Audio Data | Each Sub-File represents a Chunk of coded Audio. Audio Sub-Files are listed in chronological order. |
| 3 | Program Image | Each Sub-File contains an image associated with the Program |
| 4-15 | Undefined | Reserved for Future Use |

5.2.1.5 FILE_PARAM

FILE_PARAM is a 4 bit field that may be used to further identify the Sub-File contents.

FILE_PARAM is currently reserved for future use and shall be ignored by all current receivers.

5.2.1.6 OFFSET

The OFFSET field contains the byte offset from the start of the file at which the Sub-File is located.

5.3 Program Metadata Sub-File (FILE_TYPE=0)

The first Sub-File in the Showcase Program File is the Program Metadata Sub-File. The Program Metadata Sub-File contains metadata information associated with the Showcase Program. Showcase Metadata takes the form of a series of TAG—PARAMETER pairs, where TAG is an 8 bit field and the PARAMETER field varies in size depending on the data in the Tag field.

The TAG field indicates the type of Metadata referenced and the size and presence of the associated Parameter field. In some cases the reference means that the PARAMETER field contains the actual Metadata value or, when the Metadata referenced is Text or another file the PARAMETER field contains an index value used to locate the actual metadata.

Within the Program Metadata File the Metadata falls into two types:

- Program Metadata that apply to the whole Program. This will include Showcase ID, Showcase Title etc and is described in
- Content Metadata that apply to locations within the Program. The Content Metadata values are linked to Timestamps in the metadata. Timestamps have defined TAG value.
- Segments and Tracks provide a way of identifying different parts of a Showcase Program as shown in FIG. 16.
- A Track is an identifiable piece of content within the Showcase Program.
  - Each Track forms a separate sub-file in the Showcase Program File
    - In music programming each song is a Track
    - In Talk programming a number of Tracks may be used to form a Talk program.
    - The Metadata file provides all of the valid metadata at the start of each track and also defines any Metadata changes that may occur during a track
  - A Segment is a Track or group of contiguous tracks that form an identifiable part of the Program.
    - If a Program could be likened to a book then a Segment would be a chapter.
    - The Metadata for each Track identifies the Segment that encompasses the Track
    - Each Track may be in only one Segment
  - Segments have a single set of metadata that applies for the complete Segment.

Data within the Metadata File is formatted as shown in Table 7.

Program Metadata, that applies to the whole Showcase Program is listed first in TAG and Parameter Pairs.

Content Metadata is listed after the Program Metadata. Content Metadata is listed by time, and provided with an Index value that comprises a Chunk Identifier that indicates the Audio Subfile that contains the Metadata and a time Offset that indicates the time in the Chunk where the Metadata becomes valid. After the Index there are a series of TAG and Parameter pairs that contain the Content Metadata Values that change at the timestamp.

TABLE 7

Metadata Sub-File Format

| Item | Label | Size in Bits | Comments |
| --- | --- | --- | --- |
| 1 | SHOWID | 16 | Content ID of the Showcase Program |
| 2 | PROGRAM | 16 | File offset of the start of the Program Level Metadata |
| 3 | CONTENT | 16 | Number of Content Tracks and Segments in Program |
| | Item 4 is repeated [CONTENT] times | | |
| 4 | MOFFSET | 20 | File offset of the start of the Metadata and Metadata Type |

Metadata Tags Follow

5.3.1 Showcase Identifier (SHOWID)

The SHOWID field contains an integer used to match the Showcase Program to its management information in the Catalog Carousel. Over the life of the service the identifier values may be reused. Values shall not be reused for a period of 180 days after their last previous presence in the service.

This value is identical to the SHOWID value that is carried in the Showcase Catalog described in Section 4.2.2 above.

All Showcase Programs have a Showcase Identifier.

5.3.2 Program Data Location (PROGRAM)

PROGRAM is an 16-bit field that indicates the byte count into the Metadata file where the number of Program Metadata TAG and PARAMETER pairs Start. Program Metadata TAG and PARAMETER pairs are associated with Program Level properties such as the name of the Showcase Program, and its description.

5.3.3 Content Metadata Count (CONTENT)

CONTENT is a 16 bit field that contains the number of Content Metadata Entries present in the Program. Each Metadata Entry in the Program has a corresponding MOFFSET field present.

5.3.4 Content Metadata Offset Location (MOFFSET)

MOFF SET is a 24-bit field that indicates the type of Content Metadata and the byte count into the Metadata file where the Metadata TAG and PARAMETER pairs for this start. The 4 MSBs contain the Type of Content Metadata and the 16 LSBs contain the Byte Count offset to the start of the Metadata

| 4 MSBs of MOFFSET | Type of Metadata |
| --- | --- |
| 0 | Segment |
| 1 | Track |
| 2-15 | Reserved for Future Use |

The Segment and Tracks are listed in playback order. As described earlier in this Section, a Segment can contain a number of Tracks and a Track can only be in one Segment. By rule, the Segment entry appears in the list before all of the Track entries within that Segment. Segment boundaries always coincide with Track Boundaries The Showcase Service has a hierarchy of Metadata as shown below

TABLE 8

Metadata Hierarchy

| Hierarchy Level | Comment |
| --- | --- |
| Program (Highest) | Program level Metadata is valid for the complete Program |
| Segment (Middle) | Segment Metadata is valid for a complete Segment. It is cleared after the Segment is completed. If Metadata is defined for one Segment but is not defined for the next Segment then it is absent for the next Segment |
| Track (Lowest) | Track Metadata is defined for the start of a track. Track Metadata can change during a track a Transition Point. All Track Metadata values are cleared at the end of a Track or at a Transition point. If Metadata is not defined after the end of a Track or after a transition point then it is absent |

Using an example, the MOFFSET values for the Metadata of the Segments and Tracks in that Program Example would be listed in the order shown in Table 9

TABLE 9

Example List Order

| MOFFSET List Order | Metadata |
| --- | --- |
| 1 | Segment 0 |
| 2 | Track 0 |
| 3 | Track 1 |
| 4 | Segment 2 |
| 5 | Track 3 |
| 6 | Segment 3 |
| 7 | Track 4 |

5.3.5 TAG and PARAMETER

The TAG and PARAMETER pair provides a construct for indicating Context and Value.

Figure 23:
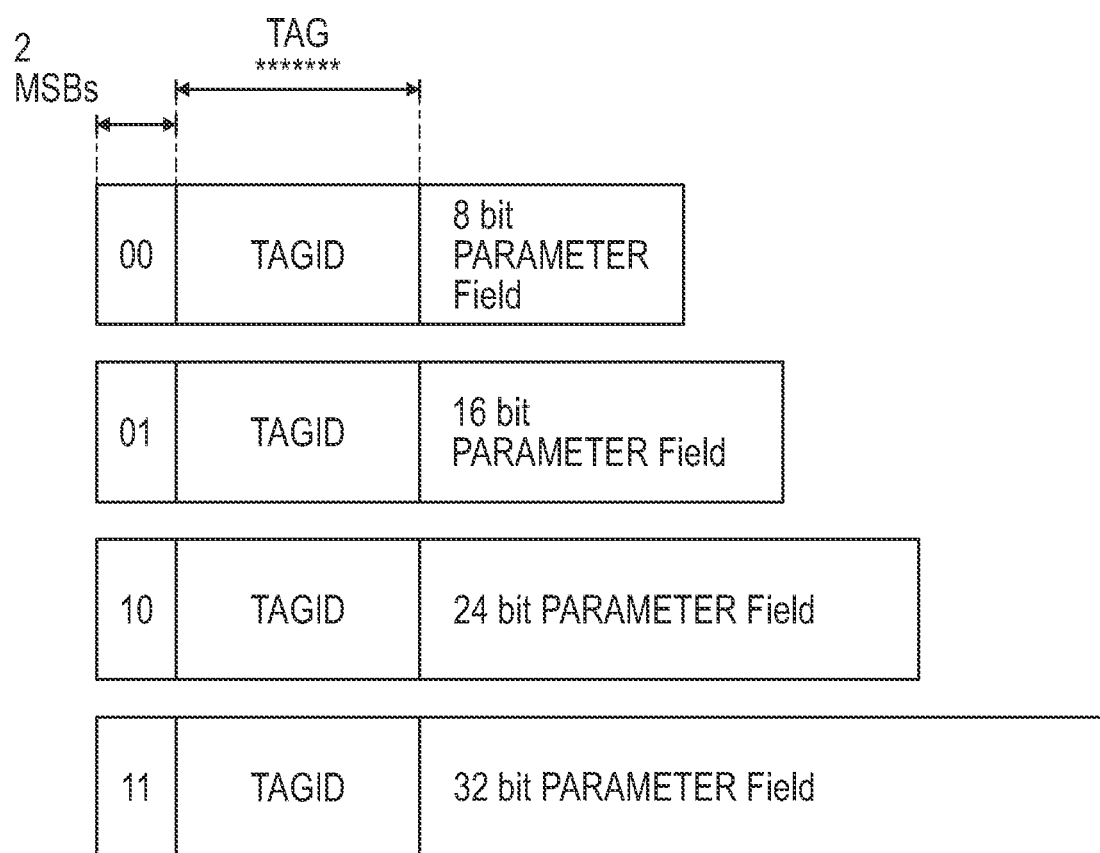
FIG. 23 depicts an exemplary set of tag ID and parameter pairs for each of 8, 16, 24 and 32 bit parameter fields, according to exemplary embodiments of the present invention.

This is illustrated, for example, in FIG. 23.

TAG is an 8 bit field whose two MSBs indicate the size of the subsequent PARAMETER field If the two MSBs of the TAG field have the value '00' then the PARAMETER field is 8 bits.

If the two MSBs of TAG field have the value '01' then the subsequent PARAMETER field is 16 bits If the two MSBs of TAG field have the value '10' then the subsequent PARAMETER field is 24 bits If the two MSBs of TAG field have the value '11' then the subsequent PARAMETER field is 32 bits The 6 LSBS of the TAG value form the TAGID which is unique identifier defined in subsequent sections of this document that indicate the Context of the Value in the subsequent PARAMETER field.

The PARAMETER field, if present, contains the Value associated with the TAG.

All TAGIDs and their PARAMETER Descriptions are listed in Table 10.

TABLE 10

TAGIDs and PARAMETERS

| TAGID | PARAMETER Description | Hierarchy Level |
| --- | --- | --- |
| 0 | Pair Count | All |
| 1 | Original Air Date | Program |
| 2 | Index to Showcase Medium Title | Program |
| 3 | Index to Showcase Long Title | Program |
| 4 | Index to Showcase Short Description | Program |
| 5 | Index to Showcase Long Description | Program |
| 6 | Index Art | All |
| 7 | Duration | All |
| 8 | Index to Segment Short Description | Segment |
| 9 | Index to Segment Long Description | Segment |
| 11 | SXM Song/Content ID | Track |
| 12 | Index to Content Title | Track |
| 13 | SXM Artist ID | Track |
| 14 | Index to Artist Name | Track |
| 15 | Index to Album Title | Track |
| 16 | Index to Composer Name | Track |
| 17 | iTunes ID | Track |
| 18 | Externally Defined Content ID | Track |
| 19 | Transition Offset | Track |
| 20-63 | Undefined | — |

5.3.5.1 Pair Count (TAGID=0)

The Pair Count PARAMETER contains the number of TAG-PARAMETER pairs associated with a Program or section with a Program.

Figure 24:
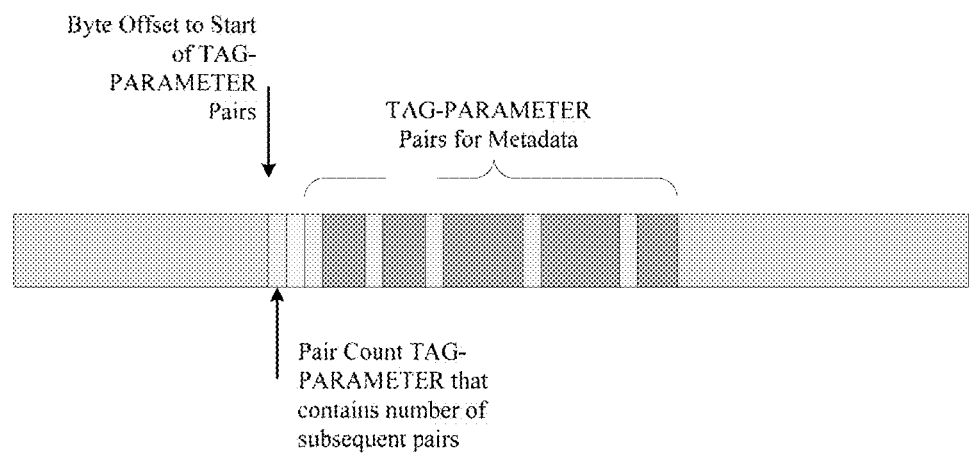
FIG. 24 illustrates an exemplary pair count according to exemplary embodiments of the present invention.

For Example: If there are 5 TAG-PARAMETER pairs providing the Program Level metadata for a Showcase Program, as shown in FIG. 24, then the Metadata File PROGRAM field (Section 5.3.2) contains the offset byte count that points to the start of the Program Metadata. The first TAG-PARAMETER pair is the Pair Count where the PARAMETER field contains a 5 value. The five subsequent TAG-PARAMETER Pairs contain all of the Program Metadata. This is illustrated, for example, in FIG. 24. Pair Count is used at all levels of the Metadata Hierarchy so this example also applies for the retrieval of Segment and Track Metadata.

5.3.5.2 Original Air Date (TAGID=1)

The Original Airdate PARAMETER contains the date of the original airing of the Program The value is defined as midnight of the day, UTC. It is encoded as the number of days since the start of the UNIX epoch (1970-01-01T00:00), calculated as (unixtime/86400), where unixtime is midnight (UTC) on the date in question. It is transmitted in 16 bits (which gives a range of 180 years).

An original air date of Apr. 1, 2006 (2006-04-01), for example, would be encoded as 0x33B7.

If the Showcase program has never been aired then this TAGID and PARAMETER pair is not present in the Metadata File.

5.3.5.3 Showcase Medium Title (TAGID=2)

The PARAMETER field contains an index value to the Showcase Medium Title of the Program. The value in the field is an index into the Compressed Text file described above.

This version of the Title can be used when browsing a list of Showcase content

The maximum size of the text string identified by the index is TBD displayable characters plus a terminating NUL.

5.3.5.4 Showcase Long Title (TAGID=3)

The PARAMETER field contains an index to the complete version of the Title of the Showcase Program. This version of the Title can be used when browsing a list of Showcase content or when displaying a more detailed view of the Showcase content. The value in the PARAMETER field is an index into the Compressed Text file described in Section 5.4.

The Long Title is an optional field and if not present I present then a compliant receiver shall display MED_TITLE information in its place.

The maximum size of the text string identified by the LONG_TITLE index is TBD displayable characters plus a terminating NUL.

5.3.5.5 Short Description (TAGID=4)

The PARAMETER field provides an index to an abridged version of a description of the Showcase content. This version of the Description can be used when browsing a list of Showcase content. The value in the PARAMETER field is an index into the Compressed Text file described in Section 5.4

The maximum size of the Short Description text string is TBD displayable characters plus a terminating NUL.

5.3.5.6 Long Description (TAGID=5)

The PARAMETER field provides an index to a complete version of a description of the Showcase Program. This version of the Description can be used when browsing a list of Showcase content or when displaying a more detailed view of the Showcase content. The value in the PARAMETER field is an index into the Compressed Text file described in Section 5.4.

The Long Description is optional. If it is not present then a compliant receiver shall display Short Description information in its place.

The maximum size of the text string identified by the LONG_DESC index is TBD displayable characters plus a terminating NUL.

5.3.5.7 Index to Art (TAGID=6)

The Index to Artwork TAGID PARAMETER field contains the Offset value, in bytes from the start of the Showcase File to the start of a JPEG Sub-File that contains the Artwork.

Showcase content may contain more than Artwork and they can be included at all levels of the Metadata Hierarchy. Artwork is not a required field at any level of the hierarchy.

If defined at the Program Level then it can be used to represent the Program. A receiver may display this artwork as part of the detailed information of the show.

If defined at the Segment Level then it can be used by the receiver to represent the Segment If defined at the Track Level then the receiver can display the Artwork while the track is playing.

5.3.5.7 UI Guidelines for Using the Hierarchy of Artwork During Content Playback If a receiver is capable of displaying Artwork during content playback then is shall follow these guidelines
  If the currently playing Track has Artwork defined then is shall display the Track Artwork
  If the currently playing Track does not have defined Artwork but the Segment in which it is in has Artwork defined then the receiver shall display the Segment Artwork
  If the currently playing Track and the Segment that it is in does not have Artwork defined but the Program has Artwork defined then the receiver shall display the Program Artwork If the Program contains no Artwork at any level then the receiver shall display default Artwork.

5.3.5.8 Duration (TAGID=7)

The PARAMETER field of the Duration field is the time in Seconds of the part of the Program that is defined by its hierarchy level. If the Duration is present at the Program. Duration is applicable at the Program Segmen and Track levels. The LSB of the Duration PARAMETER field represents 1 second. This value is intended to be used in the user interface and is only accurate to the nearest second.

5.3.5.9 Short Segment Description (TAGID=8)

The Short Segment Description provides an index to an abridged version of a description of the current Segment of the Showcase Program. The value in the PARAMETER field is an index into the Compressed Text file described above, in connection with FIG. 17.

The maximum size of the text string is TBD displayable characters plus a terminating NUL.

The Short Segment Description is optional

5.3.5.10 Long Segment Description (TAGID=9)

The Long Segment Description provides an index to a complete version of the Description of the current Segment of the Showcase Program. The value in the PARAMETER field is an index into the Compressed Text file described in Section 5.4

The maximum size of the Long Segment Description text string is TBD displayable characters plus a terminating NUL.

If the Long Segment Description is not present then a compliant receiver shall display Short Segment Description information in its place.

5.3.5.11 SXM Song ID (TAGID=10)

The PARAMETER field of the SXM Song ID contains the SXM PID value for the current Track. The PID value is a unique identifier for the content in the "Cut" and is used to enable content Alerts. Some Tracks may not have SXM Song ID values. In this case the TAGID is not present.

5.3.5.12 Index to Content Title (TAGID=11)

The Title provides an index to the text of the Title of the current Track of the Showcase Program. The Title of a Track may be the name of a Song or the name of the presenter. The value in the PARAMETER field is an index into the Compressed Text file described in Section 5.4

The maximum size of the text string is TBD displayable characters plus a terminating NUL.

5.3.5.13 Artist ID (TAGID=12)

The PARAMETER field of the ArtistID TAGID contains the SXM Artist ID value for the current Track. The Artist ID value is a unique identifier for the Artist that performs the Track and is used to enable content Alerts.

Some Tracks may not have SXM ARTIST values. In this case the TAGID is not present.

5.3.5.14 Index to Artist Name (TAGID=13)

This field provides an index to the text of the Artist of the current Track of the Showcase Program. The Artist of a Track may be the name of the Artist performing in the Track or may have been repurposed to provide other textual information to be displayed instead of the Artists name. The value in the PARAMETER field is an index into the Compressed Text file described above.

The maximum size of the text string identified by the ARTIST index is TBD displayable characters plus a terminating NUL.

5.3.5.15 Index to Album Name (TAGID=14)

This field provides an index to the text of the Album Name of the current Cut of the Showcase Program. The Album of a Cut may be the name of the Album or may have been repurposed to provide other textual information to be displayed instead of the Album name. The value in the PARAMETER field is an index into the Compressed Text file described above.

The maximum size of the text string identified by the ARTIST index is TBD displayable characters plus a terminating NUL.

5.3.5.16 Index to Composer Name (TAGID=15)

COMPOSER provides an index to the text of the Composer of the current Track of the Showcase Program. The Composer of a Track may be the name of the Composer of what is performed on the Track or may have been repurposed to provide other textual information to be displayed instead of the Composer name. The value in the PARAMETER field is an index into the Compressed Text file described above.

The maximum size of the text string identified by the COMPOSER index is TBD displayable characters plus a terminating NUL.

5.3.5.17 iTUNES (TAGID=16)

If the current Track has an iTunes ID then the iTUNES TAG is present and its 32 bit PARAMETER field contains the iTunes ID.

5.3.5.18 EXT_ID (TAGID=17)

If the current Track has been assigned another ID value then the EXT_ID is present and its 32 bit PARAMETER field contains this additional ID.

5.3.5.19 Transition Point (TAGID=18)

A Transition Point is a point in a track where the Metadata for the Track changes. The PARAMETER field associated with the Transition Point TAG contains the offset in ¹/₁₀th of a second increments from the start of the Track that identifies the location of the Transition Point.

All of the Track Metadata present in the list of TAG-PARAMETER pairs prior to the Transition Point TAG are valid from the Start of the Track to the time of the Transition Point.

All of the Track Metadata present in the list of TAG-PARAMETER pairs after the Transition Point TAG are valid from the time of the Transition Point to the end of the Track, or the next Transition Point.

The example shown in Table 11 is for a hypothetical Track that starts out with Metadata that indicates that the Content is John Lennon performing Imagine from the Album Imagine. 65 seconds into the track there is a Transition Point and the the Metadata transitions to indicate that it is Yoko Ono performing My Man, and no Album information.

TABLE 11

Transition Point Example

| TAG-PARAMETER Count | TAGID | PARAMETER VALUE |
|---|---|---|
| 1 | Pair Count | = 6 |
| 2 | Content Title | Link to 'Imagine' |
| 3 | Artist Name | Link to 'John Lennon' |
| 4 | Album Name | Link to 'Imagine' |
| 5 | Transition Point | 650 |
| 6 | Content Title | Link to 'My Man' |
| 7 | Artist Name | Link to 'Yoko Ono' |

5.4 Compressed Text Sub-File (FILE_TYPE=1)

The Compressed Text Sub-File is a list of NUL-separated text strings that have been concatenated and then compressed using the methods of RFC 1950 (zlib) and RFC 1951 (deflate).

The location of the start of the Compressed Text Sub-File is defined in the header of the Showcase file.

The first byte of the sub-file is the Compression Method and Flags' byte of RFC1950, followed by the 'Flag' byte. These bytes are always 0x78 and 0xda. These are immediately followed by one or more blocks in RFC 1951 format (i.e. a BFINAL bit, followed by 2 bits of BTYPE followed by compressed data). The sub-file ends with the Adler-32 checksum as defined in RFC 1950.

After decompression the series of concatenated text strings can be recovered.

Each text string is coded as per ISO8859-1, and is terminated with a NUL character. Text Strings form a contiguous series of symbols that occupy the whole of the uncompressed file.

A compliant receiver can index through the concatenated Text Strings to identify each individual string by detecting the NUL characters that terminate each String.

The PARAMETER values used in the Program Metadata Sub-File can be used to find their matching text string in the decompressed file. Each PARAMETER value corresponds with the [PARAMETER]+1$^{th}$ byte in the file, which is the first byte of the Text String.

A PARAMETER value of 0x10 identifies the 17th byte of the uncompressed file which is the first byte of Text String A A PARAMETER value of 0x24 identifies the 37th byte of the uncompressed file which is the first byte of Text String B.

Figure 25:
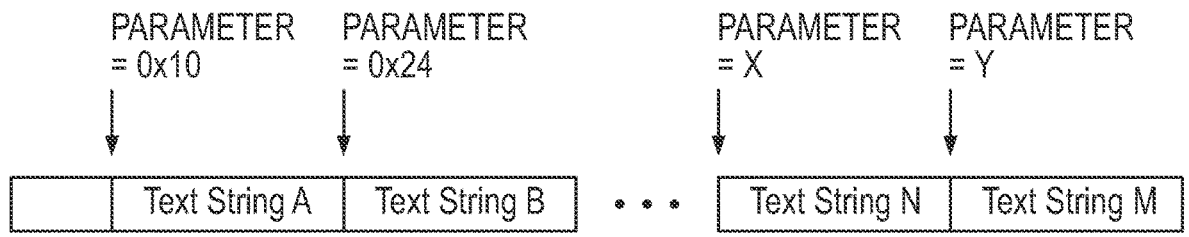
FIG. 25 illustrates an example of text indexing according to exemplary embodiments of the present invention.

FIG. 25 illustrates a text indexing example.

5.5 Compressed Audio Sub-File (FILE_TYPE=2)

The audio of the Showcase Program has been compressed using a USAC codec, which is an advanced speech and music codec designed for low bit rate applications.

The compressed audio stream of the Showcase Program is divided into Sub-Files. The Sub-Files each contain a Track from the complete Program.

Compressed Audio Sub-files are listed in chronological order in the Showcase Program File.

5.6 Program Image Sub-File (FILE_TYPE=3)

A Showcase Program may have a number of Images associated with it. Each Image is contained with a Program Image Sub-File.

The Showcase File Header information defines the location of each Program Image Sub-File by a byte offset value defined in Section 5.2.1.6. The Program Metadata uses this same offset value to indicate when each Program Image should be displayed.

5.6.1 Image Compression

Showcase images are compressed using JPEG. A compliant JPEG decoder shall support baseline JPEG
 Different tile sizes
  Y (8×8) and
  CrCb (16×16)
 Standard JPEG color model to convert back to RGB.
 Support for the following markers:
  Start of Image (SOI)
  Define Quantization Table (DQT)
  Start of Frame (SOFO)
  Start of Scan (SOS)
  End of Image (EOI)

[End of Appendix A—Protocol Specification]

Exemplary Systems

In exemplary embodiments of the present invention, any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/Figs. can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Exemplary User Interaction

In exemplary embodiments of the present invention, an EPG can be a useful means to present downloadable content to a user. Alternatively, other methods can implemented a selection system in a menu system, to prompt a user as content becomes available, or have preset physical button. In exemplary embodiments of the present invention, an EPG or menu could organize the content by way topical grouping, can, for example, be by date, or by other means that presents options to a user in a logical manner.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

What is claimed is:

1. A method for providing cacheable content, comprising:
monitoring, by a user device, broadcast channels for cacheable content;
maintaining, by the user device, a list of cacheable content;
receiving, by the user device, content caching service (CCS) data associated with the list of cacheable content of the broadcast channels, wherein the CCS data includes metadata associated with a group of cacheable content items corresponding to two or more of the broadcast channels;
selecting, by the user device, one or more cacheable content items of the group of content items based on the CCS data and a history of user preferences;
downloading, by the user device and via a broadcast communications path, the selected one or more cacheable content items; and
presenting, for playback, the one or more cacheable content items to a user associated with the user device.

2. The method of claim 1, wherein each content item of the group of cacheable content items includes at least one of compressed audio for multiple audio programs and images for program logos.

3. The method of claim 1, wherein the one or more cacheable content items are downloaded based on Reliable File Delivery (RFD) encoding.

4. The method of claim 3, further comprising:
receiving a binary file comprising a stream of data blocks.

5. The method of claim 4, further comprising:
determining that a sufficient number of data blocks have been received; and
decoding the binary file based on RFD decoding.

6. The method of claim 5, wherein the selecting the one or more cacheable content items is further based on a recommendation engine running on the user device.

7. The method of claim 6, wherein the recommendation engine determines various user listening behavior parameters.

8. The method of claim 1, wherein the selecting the one or more cacheable content items is further based on a live broadcast time.

9. The method of claim 1, wherein the group of cacheable content items is chosen by a content provider.

10. The method of claim 9, wherein the content provider is one of a satellite radio broadcaster and a content streaming service, and wherein the group of cacheable content items includes related content elements or tracks, each content element or track corresponding to a different broadcast channel.

11. The method of claim 1, wherein the CCS data further includes digital rights management (DRM) information that is indicative of at least one of: restrictions on a number of times a respective content item can be played back, electronic program guide identifiers, on-demand identifiers and date ranges within which the respective content item can be played on the user device.

12. The method of claim 1, further comprising:
determining a download priority for the one or more cacheable content items based on a total cumulative receive time associated with an ON state of the user device during a period of data transmission associated with the content items.

13. The method of claim 12, wherein the determining the download priority for each of the one or more cacheable content items is based on a determination of at least one of (a) a time duration for each content item, (b) a broadcast data rate and (c) a broadcast repeat rate.

14. A system for providing cacheable content, comprising:
a computing device configured to:
monitor broadcast channels for cacheable content;
maintain, by the user device, a list of cacheable content;

receive content caching service (CCS) data associated with the list of cacheable content of the broadcast channels, wherein the CCS data includes metadata associated with a group of cacheable content items corresponding to two or more of the broadcast channels;

select one or more cacheable content items of the group of content items based on the CCS data and a history of user preferences;

download, via a broadcast communications path, the selected one or more cacheable content items; and present, for playback, the one or more cacheable content items to a user associated with the computing device; and a broadcasting device configured to:
send the CCS data to the computing device.

15. The system of claim 14, wherein each content item of the group of cacheable content items includes at least one of compressed audio for multiple audio programs and images for program logos.

16. The system of claim 14, wherein the computing device is further configured to:
receive a binary file comprising a stream of data blocks;
determine that a sufficient number of data blocks have been received; and
decode the binary file based on RFD decoding.

17. The system of claim 14, wherein the computing further configured to select the one or more cacheable content items based on a recommendation engine running on the computing device.

* * * * *